(12) United States Patent
Sakashita et al.

(10) Patent No.: US 11,162,515 B2
(45) Date of Patent: Nov. 2, 2021

(54) SERVO VALVE

(71) Applicant: SMC CORPORATION, Chiyoda-ku (JP)

(72) Inventors: Junji Sakashita, Koshigaya (JP); Kaname Inoue, Moriya (JP); Hisashi Yajima, Tsukuba (JP); Masayuki Ishikawa, Tsukubamirai (JP); Satoru Ito, Tsuchiura (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/870,193

(22) Filed: May 8, 2020

(65) Prior Publication Data

US 2020/0271137 A1    Aug. 27, 2020

Related U.S. Application Data

(62) Division of application No. 15/956,369, filed on Apr. 18, 2018, now Pat. No. 10,697,477.

(30) Foreign Application Priority Data

Dec. 8, 2017    (JP) ............................. JP2017-235667

(51) Int. Cl.
*F15B 13/04* (2006.01)
*F15B 13/044* (2006.01)
(Continued)

(52) U.S. Cl.
CPC ...... *F15B 13/0402* (2013.01); *F15B 13/0442* (2013.01); *F15B 13/10* (2013.01);
(Continued)

(58) Field of Classification Search
CPC ........... Y10T 137/8667; F15B 13/0402; F15B 13/0442; F15B 13/10; F15B 2013/0409;
(Continued)

(56) References Cited

U.S. PATENT DOCUMENTS 3,749,128 A * 7/1973 Sallberg .............. F15B 13/0402
137/625.61
4,001,844 A * 1/1977 McClintock ........... G03B 7/083
396/304
(Continued)

FOREIGN PATENT DOCUMENTS

CN        101737525 A  ‡  6/2010
GB        2 243 488 A  ‡  10/1991
(Continued)

*Primary Examiner* — Seth W. Mackay-Smith
(74) *Attorney, Agent, or Firm* — Oblon, McClelland, Maier & Neustadt, L.L.P.

(57) ABSTRACT

A servo valve has a movable element disposed inside a body, and a drive unit to slide the movable element in the axial direction. A first elastic portion on one end portion side of the body has a first elastic force to press the movable element toward the drive unit connected to another end portion of the body; a second elastic portion on another end portion side of the body has a second elastic force to press the movable element toward the one end portion side of the body. A connecting portion is connected to the second elastic portion, wherein at a neutral position of the movable element, the connecting portion abuts against an inner peripheral surface of the body and against the movable element. An end of one of the first and second elastic portions is fixed directly to the movable element, and an end of the other of the first and second elastic portions is connected to the connecting portion.

15 Claims, 17 Drawing Sheets

(51) Int. Cl.
  *F15B 13/10* (2006.01)
  *F16K 31/06* (2006.01)
  *F16K 37/00* (2006.01)
  *F16K 31/08* (2006.01)
  *H01F 7/16* (2006.01)
  *H01F 7/122* (2006.01)
  *H01F 7/13* (2006.01)

(52) U.S. Cl.
  CPC ........ *F16K 31/061* (2013.01); *F16K 31/0613* (2013.01); *F16K 31/082* (2013.01); *F16K 37/0033* (2013.01); *F16K 37/0041* (2013.01); *F15B 2013/0409* (2013.01); *F15B 2013/0448* (2013.01); *H01F 7/122* (2013.01); *H01F 7/13* (2013.01); *H01F 7/1615* (2013.01); *Y10T 137/8667* (2015.04)

(58) Field of Classification Search
  CPC ........... F15B 2013/0448; F16K 31/061; F16K 31/0613; F16K 31/082; H01F 7/122; H01F 7/1615
  See application file for complete search history.

(56) References Cited

U.S. PATENT DOCUMENTS

| | | | | |
|---|---|---|---|---|
| 5,108,070 | A * | 4/1992 | Tominaga | H01F 7/13 251/65 |
| 5,117,869 | A * | 6/1992 | Kolchinsky | F16K 31/0613 137/625.65 |
| 5,284,220 | A * | 2/1994 | Shimizu | F15B 13/0402 137/330 |
| 5,896,076 | A * | 4/1999 | van Namen | H01F 7/1615 335/222 |
| 5,947,155 | A * | 9/1999 | Miki | G05D 16/2024 137/625.65 |
| 6,422,533 | B1 * | 7/2002 | Harms | F16K 31/0613 251/129.1 |
| 6,609,538 | B2 * | 8/2003 | Royle | B60T 8/3665 137/625.65 |
| 6,739,211 | B2 * | 5/2004 | Yamamoto | F16H 61/32 74/335 |
| 6,786,237 | B2 * | 9/2004 | Yajima | F15B 13/0402 137/554 |
| 6,867,511 | B2 * | 3/2005 | Fukunaga | H02K 33/16 310/12.24 |
| 7,368,838 | B2 * | 5/2008 | Binnard | H02K 41/0356 310/15 |
| 8,960,221 | B2 * | 2/2015 | Nomichi | F02M 21/0239 137/487.5 |
| 9,388,912 | B2 * | 7/2016 | Funakubo | F16K 31/0613 |
| 9,685,850 | B2 * | 6/2017 | Kozo | H02K 41/0356 |
| 9,889,929 | B2 * | 2/2018 | Covington | B64C 27/64 |
| 2001/0030589 | A1 * | 10/2001 | Dahlgren | H01F 7/1615 335/220 |
| 2003/0131896 | A1 ‡ | 7/2003 | Yajima | F15B 13/0402 137/62 |
| 2016/0186883 | A1 * | 6/2016 | Rausch | F16K 31/082 251/65 |

FOREIGN PATENT DOCUMENTS

| | | | |
|---|---|---|---|
| JP | 62-89584 U | ‡ | 6/1987 |
| JP | 2859459 | ‡ | 2/1999 |
| JP | 2004-194499 | ‡ | 7/2004 |
| JP | 2006-207796 | ‡ | 8/2006 |
| JP | 4099749 | ‡ | 6/2008 |

\* cited by examiner
‡ imported from a related application

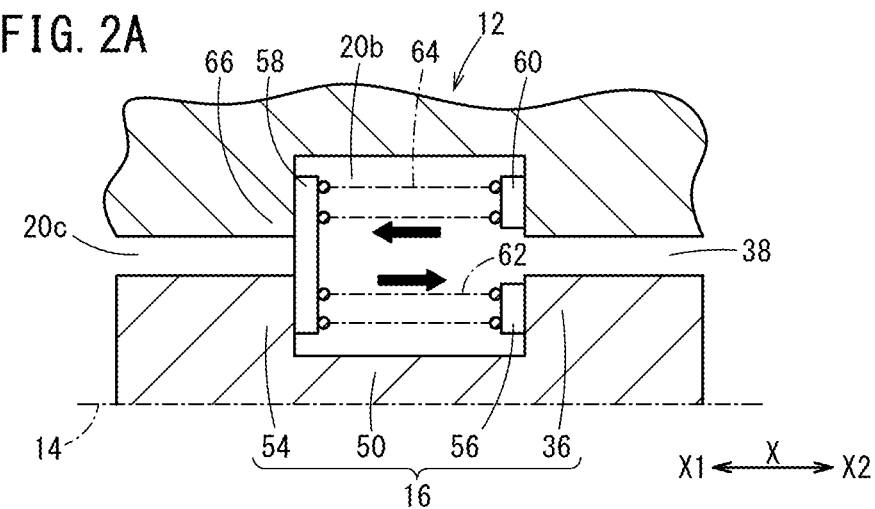
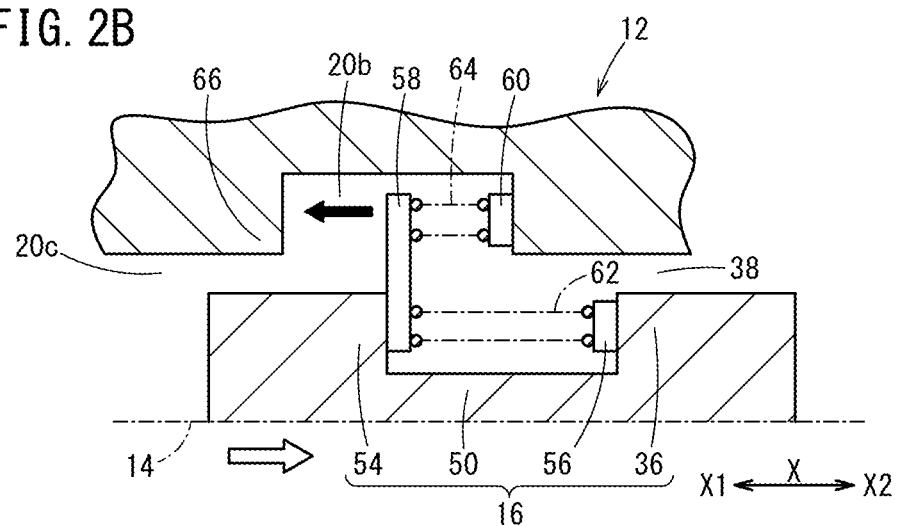
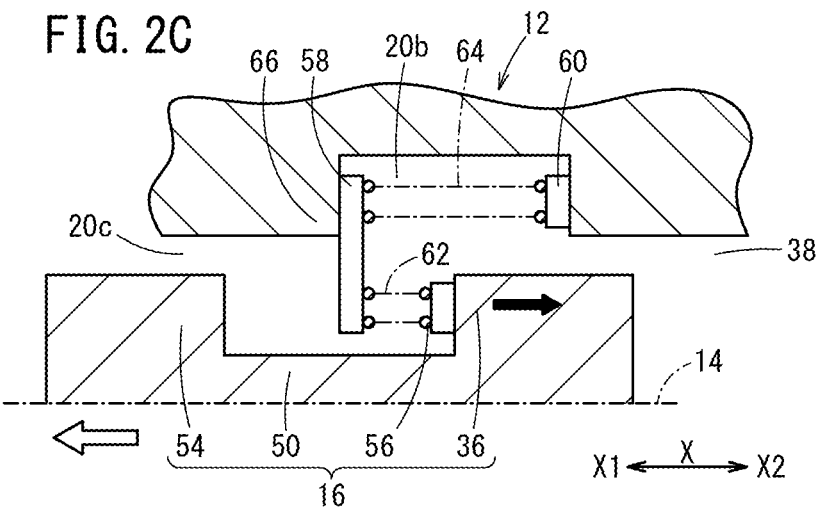

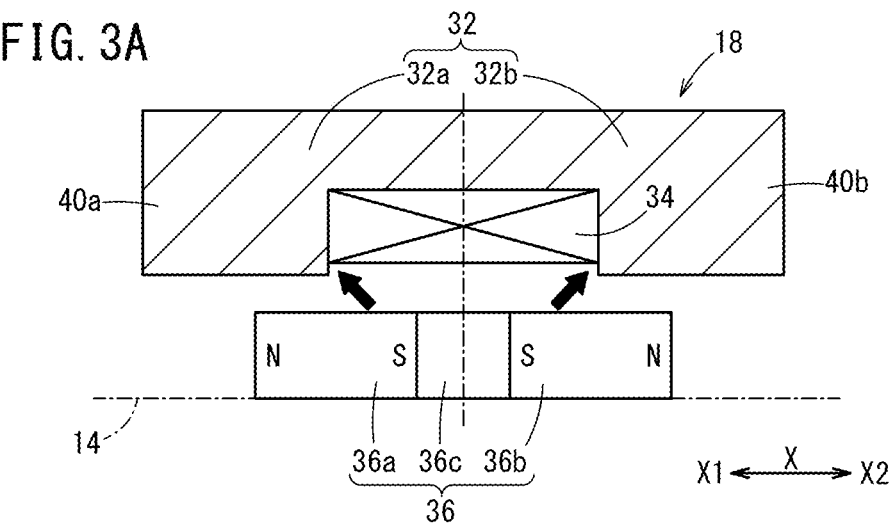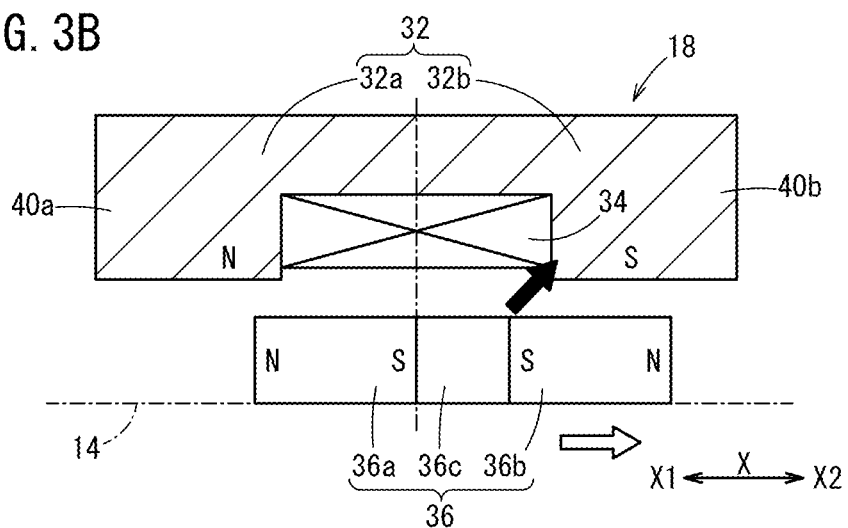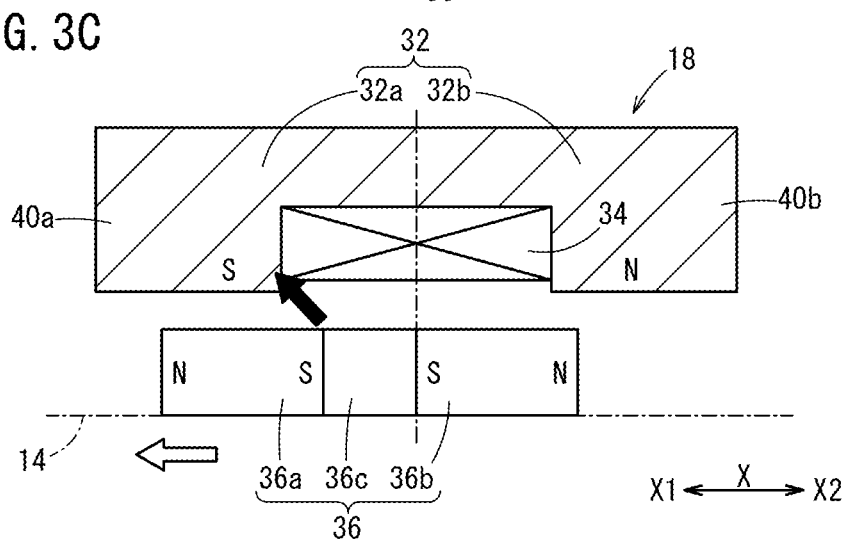

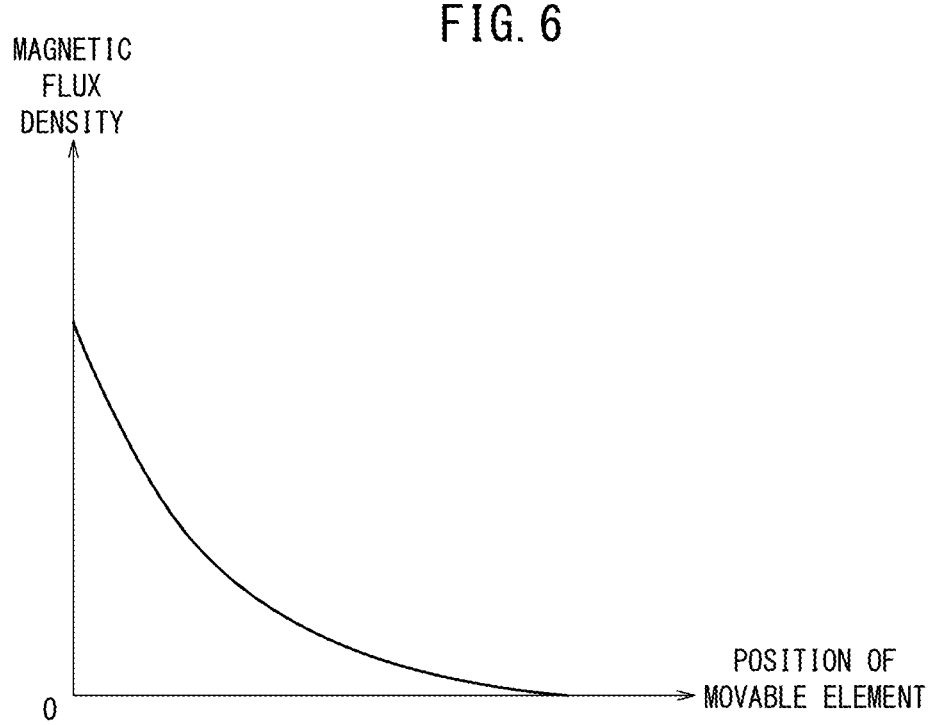

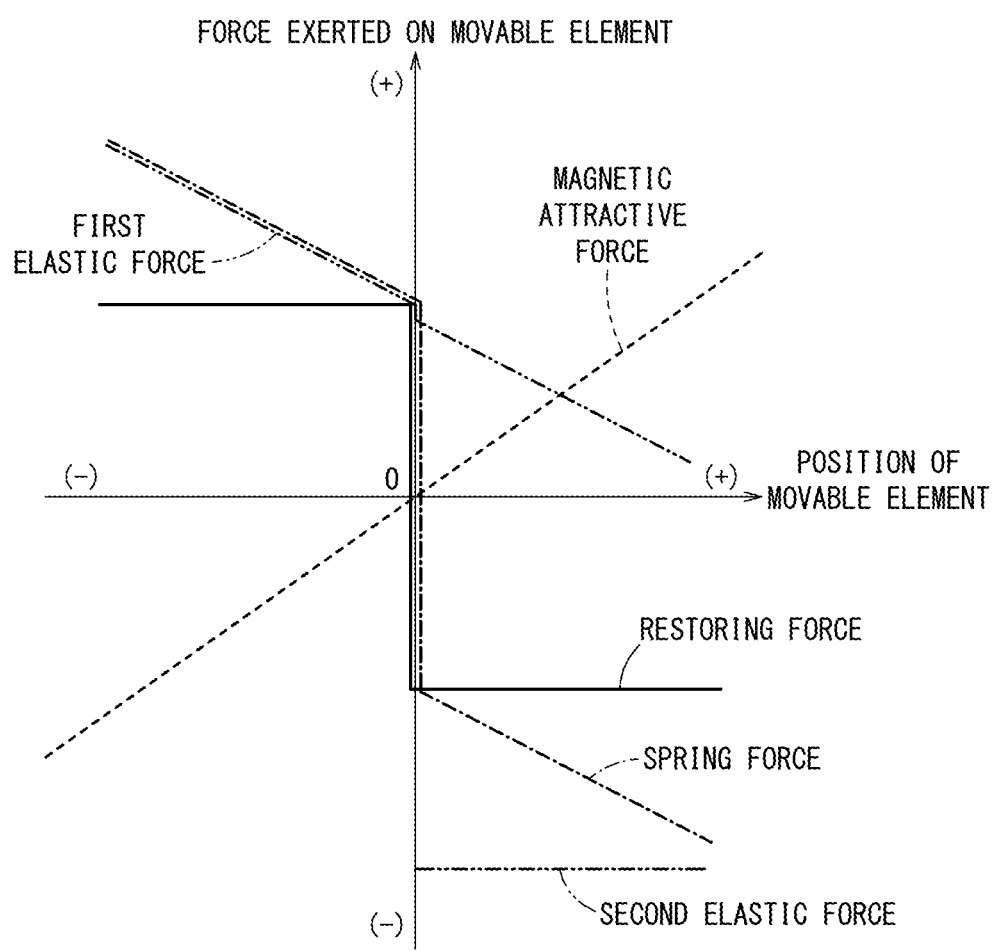

SERVO VALVE

CROSS-REFERENCE TO RELATED APPLICATIONS

This application is based upon and claims the benefit of priority from Japanese Patent Application No. 2017-235667 filed on Dec. 8, 2017 and U.S. patent application Ser. No. 15/956,369 filed on Apr. 18, 2018, the contents all of which are incorporated herein by reference.

BACKGROUND OF THE INVENTION

Field of the Invention

The present invention relates to a servo valve which switches connections of flow passages between a plurality of ports provided in a body by driving a drive unit based on an input signal from the outside to thereby slide a movable element in the body.

Description of the Related Art

Japanese Patent No. 2859459 (hereinafter referred to as Document 1), Japanese Patent No. 4099749 (hereinafter referred to as Document 2), Japanese Laid-Open Utility Model Publication No. 62-089584 (hereinafter referred to as Document 3), Japanese Laid-Open Patent Publication No. 2006-207796 (hereinafter referred to as Document 4), and Chinese Laid-Open Patent Publication No. 101737525 (hereinafter referred to as Document 5) each disclose a servo valve for switching connections of flow passages between a plurality of ports provided in a body by driving a drive unit based on an input signal from the outside to thereby slide a movable element provided in the body in an axial direction of the body.

Document 1 discloses a servo valve in which a spool (movable element) is slidably housed inside a sleeve arranged in a body. Further, Documents 2 to 4 each disclose a servo valve in which a movable element is returned to a neutral position (a position of the movable element when operation of a drive unit is stopped) by use of mechanical springs. Document 5 discloses a servo valve in which a movable element is returned to a neutral position by use of a magnetic spring. Incidentally, when the movable element is returned to the neutral position, the valve is placed in a state of a closed center with all the ports being closed, an exhaust center with output ports and exhaust ports being held in communication, or a pressure center with output ports and a supply port being held in communication.

SUMMARY OF THE INVENTION

However, in the servo valve of Document 1, in an event of occurrence of an abnormality such as a power failure or the like, the position of the movable element is not fixed because an input signal cannot be supplied from the outside to the drive unit. Thus, there is concern that the servo valve is brought into a valve opened state due to its own weight of the movable element depending on a mounting posture of the servo valve.

Further, in the servo valves of Documents 2 and 3, a restoring force of the mechanical spring that returns the movable element to the neutral position is proportional to a deviation amount from the neutral position. Thus, in the vicinity of the neutral position, the restoring force becomes small, so that the movable element is positioned unstably. As a result, a valve opened state may occur due to vibration or the like from the outside.

Furthermore, in the servo valve of Document 4, if the mechanical springs and the like have backlash or looseness, it becomes difficult to perform positioning control of the movable element or opening-degree control for a plurality of ports.

In addition, in the servo valves of Documents 2 to 4, in sliding the movable element, a motor (drive unit) with a large thrust force is required to overcome an initial load exerted on the movable element by the mechanical spring with the movable element being at the neutral position. Further, in the servo valves of Documents 2 to 4, it becomes difficult to control the positioning of the movable element and to control the opening degrees of the plurality of ports due to variation of a spring force depending on the position of the movable element.

Furthermore, in the servo valve of Document 5, the magnetic attractive force of a permanent magnet attached to the movable element is used to return the movable element to the neutral position. In this case as well, since the restoring force for returning the movable element to the neutral position is proportional to a deviation amount from the neutral position, the restoring force becomes smaller around the neutral position, so that the movable element is positioned unstably.

The present invention has been made with such problems taken into consideration, and it is an object of the present invention to provide a servo valve capable of stably performing positioning control of a movable element.

According to an aspect of the present invention, there is a servo valve including a tubular body having a plurality of ports formed therein, a movable element disposed inside the body in an axial direction of the body, and a drive unit connected to the body in the axial direction and configured to slide the movable element in the axial direction to thereby switch connections of flow passages between the ports.

The servo valve is further provided with a first elastic portion, a second elastic portion and a connecting portion.

The first elastic portion extends in the axial direction inside the body and has a first elastic force to press the movable element toward the drive unit side in the axial direction.

The second elastic portion extends in the axial direction inside the body and has a second elastic force to press the movable element in a direction away from the drive unit along the axial direction.

The connecting portion is connected to at least the second elastic portion inside the body, and abuts against a portion of the body that faces the drive unit and a portion of the movable element that faces the drive unit, at a neutral position of the movable element at which driving of the drive unit is stopped.

As described above, the first elastic portion and the second elastic portion have elastic forces (the first applied in mutually different directions along the axial direction.

In this case, at the neutral position, the connecting portion is pressed against a portion of the body that faces the drive unit and a portion of the movable element that faces the drive unit, by the second elastic force. Thus, since the connecting portion is restrained from moving in a direction away from the drive unit, the position of the second elastic portion is restrained between the drive unit side and the opposite side of the drive unit inside the body. As a result, since the second elastic force is not exerted on the movable element, the movable element is positioned at the neutral position where the movable element abuts against the connecting portion.

Next, when the movable element is slid toward the drive unit by driving of the drive unit, the movable element is slid together with the connecting portion toward the drive unit in the axial direction against the second elastic force. In this case, when the driving of the drive unit is discontinued, the second elastic force serves as a restoring force, so that the connecting portion and the movable element are returned to the neutral position in the axial direction.

On the other hand, when the movable element is slid in a direction away from the drive unit by driving of the drive unit, the movable element is slid in a direction away from the drive unit of the axial direction against the first elastic force in a state that the connecting portion is in abutment against a portion of the body that faces the drive unit. In this case, when the driving of the drive unit is discontinued, the first elastic force serves as a restoring force, so that the movable element is returned to the neutral position in the axial direction.

Accordingly, in the present invention, in any of the case that the movable element moves toward the drive unit and the case that the movable element moves away from the drive unit, it is possible to stably perform the positioning control of the movable element relative to the neutral position (i.e., the opening control of the respective ports). As a result, it is possible to realize a servo valve having a satisfactory function of closed center, exhaust center or pressure center.

In this case, one end of the first elastic portion may be fixed to the drive unit side of the movable element, one end of the second elastic portion may be fixed to the drive unit side of the body, and the other end of the first elastic portion and the other end of the second elastic portion may be connected to the connecting portion. Thus, with a simple structure, it is possible to improve the controllability in positioning the movable element with respect to the neutral position.

Herein, the drive unit has a tubular body containing a magnetic body and connected to the body in the axial direction, and a movable portion provided inside the tubular body and forming a portion of the movable element, the movable portion including a movable magnet, a movable coil or a movable iron core. With this structure, the movable portion is moved in the axial direction, whereby the movable element including the movable portion can be slid in the axial direction. Thus, regardless of the type of the movable portion, i.e., in any of a movable magnet type, a movable coil type and a movable iron core type, it is possible to improve the controllability in positioning the movable element.

Further, in the servo valve, it is possible to adjust a restoring force for returning the movable element to the neutral position by balancing a force exerted on the movable element from the drive unit with the first elastic force or the second elastic force. Thus, it is possible to improve the positioning control of the movable element.

Incidentally, by adjusting the restoring force such that the restoring force is constant irrespective of the position of the movable element in the axial direction, it is possible to further improve the positioning control of the movable element. In this case, if the force exerted on the movable element is a magnetic attractive force generated at the movable portion, it is possible to make the restoring force constant by balancing the magnetic attractive force with the first elastic force or the second elastic force.

Here, description will be made regarding the configuration of the servo valve where the movable portion is of the movable magnet type.

The drive unit has a first yoke, which serves as the tubular body, connected to the body in the axial direction, a coil wound around the first yoke, and a magnet portion, which serves as the movable portion, provided inside the first yoke so as to face the coil. In this case, by a magnetic attractive force exerted on the magnet portion due to energization to the coil, the movable element is slid in the axial direction.

That is, magnetic flux is generated around the magnet portion by energization to the coil, and thus, by the magnetic attractive force arising from the magnetic flux, it is possible to slide the movable element including the magnet portion in the axial direction against the elastic force of the first elastic portion or the second elastic portion. That is, the drive unit functions as a linear motor for moving the magnet portion in the axial direction. Thus, since it is possible to easily perform the positioning control of the movable element, it is possible to improve the responsiveness of the servo valve to an input signal supplied from the outside to the coil.

Further, protruding portions protruding inward of the first yoke may be provided respectively at one end side and the other end side of the first yoke in the axial direction. In this case, at the neutral position at which energization to the coil is stopped, the magnet portion is positioned between the two protruding portions.

With this structure, since the protruding portions each constitute a part of a magnetic path of the magnetic flux when the coil is energized, the magnetic attractive force can be increased as the magnet portion comes closer to the protruding portion by movement of the magnet portion in the axial direction. Further, the magnetic attractive force is balanced with the first elastic force or the second elastic force to thereby adjust the restoring force, and thus, it is possible to further improve the controllability of the servo valve (the positioning control of the movable element and the responsiveness of the servo valve).

In this case, the coil may be provided between the two protruding portions inside the first yoke, and when the movable element is at the neutral position, the magnet portion and the coil may be located at substantially the same position in the axial direction. Thus, it is possible to further improve the controllability of the servo valve.

Further, in the servo valve, the first yoke may be connected to the body so as to cover the magnet portion within a moving range within which the magnet portion is moved in the axial direction by sliding of the movable element. Thus, it is possible to further improve the controllability of the servo valve.

Further, the first yoke may be composed of two yokes arranged so as to interpose the coil therebetween in the axial direction. With this structure, the assembling performance of the servo valve can be improved.

It is preferable that the magnet portion should contain two permanent magnets arranged in the axial direction and magnetized in the axial direction, and a second yoke interposed between the two permanent magnets. With this structure, since at the time of energization to the coil, the magnetic flux generated around the magnet portion passes through the second yoke, a large thrust force arising from the magnetic attractive force is generated at the magnet portion in the axial direction. Therefore, it is possible to easily slide the movable element in the axial direction against the first elastic force or the second elastic force.

In this case, the two permanent magnets may be magnetized in mutually different magnetization directions. Thus, it is possible to easily slide the movable element toward the drive unit or away from the drive unit in the axial direction.

Further, the aforementioned servo valve may specifically be constructed as described below. That is, a sleeve provided with openings communicating with the respective ports is disposed inside the body. In this case, the movable element has the magnet portion, a spool disposed inside the sleeve the axial direction, a shaft connecting the magnet portion and the spool in the axial direction, and an annular first fixed portion disposed on the magnet portion side of the shaft, one end of the first elastic portion being fixed to the first fixed portion.

Thus, an annular second fixed portion may be provided inside the body and on the first yoke side, the second fixed portion being fixed to the body and the first yoke, wherein the shaft and the first fixed portion may penetrate through the second fixed portion, and one end of the second elastic portion may be fixed to the second fixed portion. Further, the connecting portion may be an annular member configured to, inside the body, abut against the spool and a portion of the body that is located on the spool side, the shaft penetrating through the connecting portion.

Then, the first elastic portion may be interposed between the connecting portion and the first fixed portion inside the body, and the second elastic portion may be interposed between the connecting portion and the second fixed portion inside the body.

Further, the servo valve may be further provided with a sensor disposed adjacent to the magnet portion in the axial direction and configured to detect magnetic flux. With this structure, it is possible to easily grasp the position of the movable element relative to the neutral position from variation in the magnetic flux detected by the sensor. Consequently, it is possible to perform a suitable servo control by adjusting an input signal supplied to the coil depending on the position of the movable element.

Further, in a case that the movable portion is of the movable coil type, the servo valve may be constructed as described below. That is, the drive unit has a yoke, which serves as the tubular body, connected to the body in the axial direction, two permanent magnets provided respectively at opposite ends of the yoke in the axial direction, an iron core provided inside the yoke so as to face the yoke, and a coil wound around the iron core. In this case, the movable portion contains the iron core and the coil, and the movable element is slid in the axial direction by a magnetic attractive force including at least one of a force acting between the two permanent magnets and the iron core and a force exerted on the movable portion due to energization to the coil.

On the other hand, in a case that the movable portion is of the movable iron core type, the servo valve may be constructed as described below. That is, the drive unit has a yoke, which serves as the tubular body, connected to the body in the axial direction, a permanent magnet provided at a center portion of the yoke in the axial direction, a coil provided inside the yoke in the axial direction so as to face the permanent magnet, and an iron core, which serves as the movable portion, provided inside the yoke in the axial direction. In this case, the movable element is slid in the axial direction by a magnetic attractive force including at least one of a force acting between opposite ends of the yoke and the iron core and a force exerted on the iron core due to energization to the coil.

In any of the cases of the movable coil type and the movable iron core type, as in the case of the movable magnetic type, the movable element can be slid in the axial direction by the magnetic attractive force. Therefore, it is possible to easily perform the positioning control of the movable element. As a result, it is possible to improve the responsiveness of the servo valve.

Further, in the servo valve, one end of the first elastic portion may be fixed to the movable element on a side that is across from the drive unit, the other end of the first elastic portion may be fixed to an end cover configured to close an end of the body that is located across from the drive unit, one end of the second elastic portion may be fixed to a portion of the body that is located on the drive unit side, and the other end of the second elastic portion may be connected to the connecting portion. In this case as well, with a simple structure, it is possible to improve the controllability in positioning the movable element relative to the neutral position.

Incidentally, the first elastic portion and the second elastic portion may be spring members. Thus, it is possible to reduce cost of the servo valve.

The above and other objects, features and advantages of the present invention will become more apparent from the following description when taken in conjunction with the accompanying drawings, in which a preferred embodiment and several modifications of the present invention are shown by way of illustrative examples.

BRIEF DESCRIPTION OF THE DRAWINGS

FIG. 2A to FIG. 2C are schematic diagrams each showing the movement of a movable element shown in FIG. 1;

FIG. 3A to FIG. 3C are schematic diagrams each showing the movement of a magnet portion shown in FIG. 1;

FIG. 6 is a graph showing a relationship between magnetic flux density detected by a magnetic sensor shown in FIG. 1 and the position of the movable element;

FIG. 17 is a graph showing a relationship between the position of a movable element shown in FIG. 16 and the force exerted on the movable element.

DESCRIPTION OF THE PREFERRED EMBODIMENT

Hereinafter, a preferred embodiment of a servo valve according to the present invention will be described in detail with reference to the accompanying drawings.

1. CONFIGURATION OF SERVO VALVE 10

Figure 1:
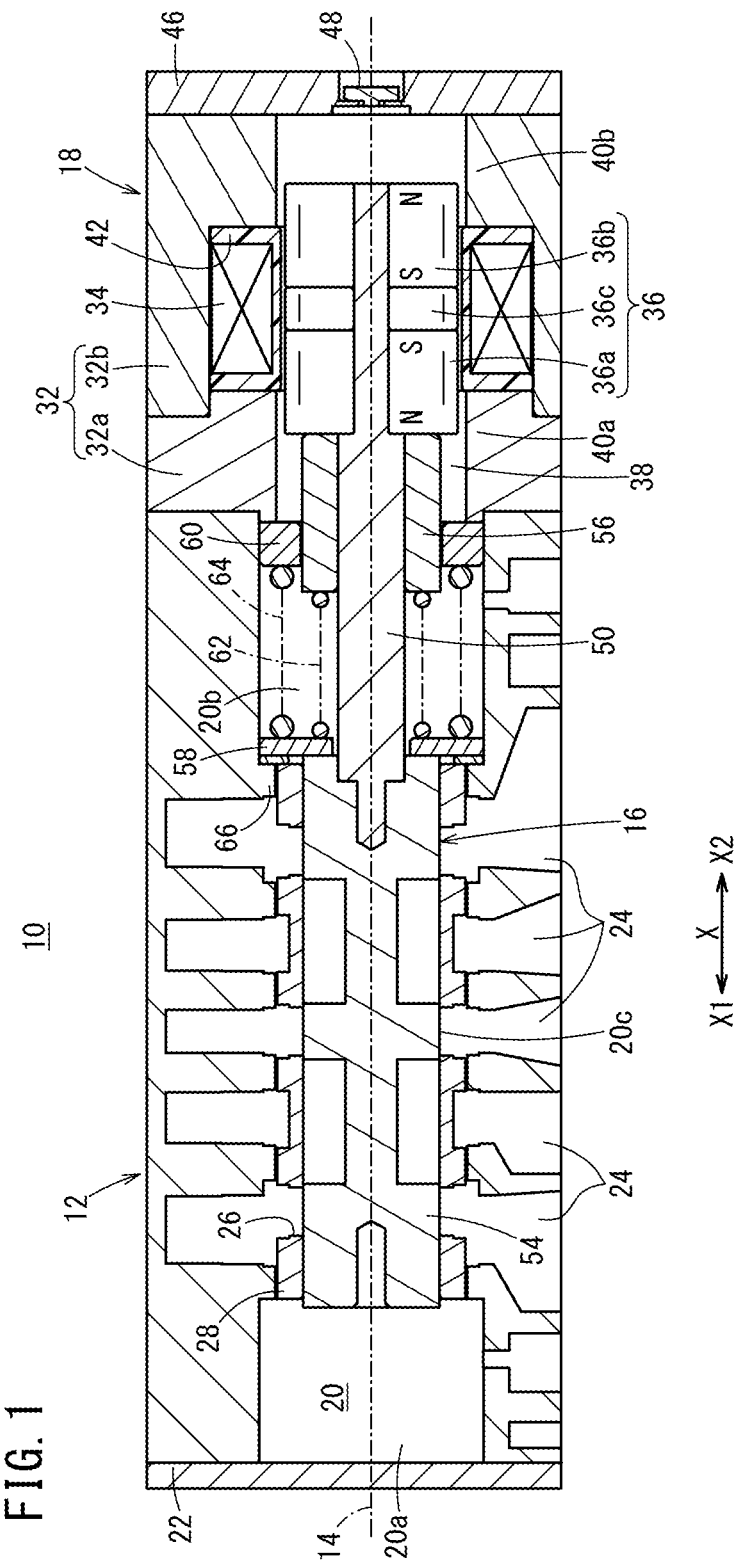
FIG. 1 is a cross sectional view of a servo valve according to an embodiment of the present invention.

FIG. 1 is a cross sectional view of a servo valve 10 according to the present embodiment.

The servo valve 10 is equipped with a tubular valve body 12, a movable element 16 disposed inside the valve body 12 substantially coaxially with a central axis 14 of the valve body 12, and a drive unit 18 connected to the valve body 12 in a direction (axial direction) along the central axis 14 and configured to slide the movable element 16 in the axial direction inside the valve body 12. Incidentally, the central axis 14 is a central axis along the longitudinal direction of the servo valve 10 including the valve body 12. In the following description, a direction (the axial direction) along the central axis 14 will be referred to as an X direction, wherein a direction toward the left side in FIG. 1 (the direction toward the valve body 12 side of the servo valve 10) will be referred to as an X1 direction, while a direction toward the right side in FIG. 1 (the direction toward the drive unit 18 side of the servo valve 10) is referred to as an X2 direction.

The valve body 12 is a tubular body in which a hole portion 20 penetrating in the X direction and accommodating the movable element 16 is formed substantially coaxially with the central axis 14. The hole portion 20 is a stepped through hole composed of two large diameter portions 20a, 20b respectively formed on one end side of the valve body 12 toward the X1 direction and on the other end side of the valve body 12 toward the X2 direction, and a central small diameter portion 20c connecting the two large diameter portions 20a, 20b. An end cover 22 is attached to one end of the valve body 12 on the X1 direction side so as to close the hole portion 20. On the other hand, the drive unit 18 is connected to the other end of the valve body 12 on the X2 direction side.

The valve body 12 has a plurality of ports 24 formed in an outer peripheral surface thereof, the ports 24 radially communicating with the small diameter portion 20c of the hole portion 20. In FIG. 1, five ports 24 are formed. That is, the servo valve 10 is a five-port servo valve which controls flow direction of fluid such as air or the like by sliding the movable element 16 in the X direction and thereby switching the connections of flow passages between the five ports 24. Incidentally, the number of the ports 24 may be suitably set depending on the specification of the servo valve 10.

A tubular sleeve 28 having a plurality of openings 26 communicating with the plurality of ports 24 is disposed at the small diameter portion 20c of the hole portion 20 in contact with an inner peripheral surface of the valve body 12.

The drive unit 18 has a tubular first yoke 32 connected to the other end of the valve body 12 on the X2 direction side, a coil 34 wound around the first yoke 32, and a magnet portion (movable portion) 36 provided inside the first yoke 32 so as to face the coil 34. The first yoke 32 is made of a magnetic body and has a hole portion 38 formed substantially coaxially with the central axis 14. The hole portion 38 of the first yoke 32 penetrates in the X direction to communicate with the hole portion 20 of the valve body 12 and houses the magnet portion 36 therein. As described later, the magnet portion 36 is constituted as a portion of the movable element 16. Thus, the magnet portion 36 is a movable portion of a movable magnet type. Further, the first yoke 32 is connected to the valve body 12 so as to cover a moving range within which the magnet portion 36 is moved in the X direction by sliding movement of the movable element 16.

The first yoke 32 is a yoke having a divided structure composed of a side yoke 32a connected to the other end of the valve body 12 on the X2 direction side, and an outer yoke 32b connected to an X2 direction side of the side yoke 32a. The side yoke 32a is a tubular body constituting one end portion of the first yoke 32 on the X1 direction side and having a first protruding portion 40a protruding toward the hole portion 38. The outer yoke 32b is a tubular body constituting the other end portion of the first yoke 32 on the X2 direction side and having a second protruding portion 40b protruding toward the hole portion 38. The coil 34 is formed by winding a conductive wire around a bobbin 42 made of an electrical insulating material. The coil 34 is disposed between the first protruding portion 40a and the second protruding portion 40b inside the first yoke 32 so as to face the magnet portion 36.

An end cover 46 made of a non-magnetic body is attached to the other end of the first yoke 32 (the outer yoke 32b) on the X2 direction side so as to close the hole portions 20, 38. A magnetic sensor 48 for measuring magnetic flux density is disposed in the end cover 46 substantially coaxially with the central axis 14.

The magnet portion 36 is composed of an annular first permanent magnet 36a disposed on the X1 direction side, an annular second permanent magnet 36b disposed on the X2 direction side, and an annular second yoke 36c as a center yoke made of a magnetic body interposed between the first permanent magnet 36a and the second permanent magnet 36b. The first permanent magnet 36a and the second permanent magnet 36b are magnetized in different directions from each other along the X direction. That is, the first permanent magnet 36a is magnetized such that the X1 direction side thereof is N-pole while the X2 direction side thereof is S-pole. The second permanent magnet 36b is magnetized such that the X1 direction side thereof is S-pole while the X2 direction side is N-pole. Incidentally, in the present embodiment, the aforementioned magnetizing direction is one example, and the magnetized direction may be any direction as long as the first permanent magnet 36a and the second permanent magnet 36b are magnetized in mutually different directions along the X direction.

The first permanent magnet 36a, the second yoke 36c and the second permanent magnet 36b are connected on a non-magnetic connector shaft 50 which extends in the X direction substantially coaxially with the central axis 14. Accordingly, the magnet portion 36 is disposed in the hole portion 38 substantially coaxially with the central axis 14.

In the energized state that an input signal is supplied from the outside to the coil 34, the movable element 16 is slid inside the hole portions 20, 38 in the X direction (toward the X1 direction or X2 direction) by a force exerted on the magnet portion 36, that is, by a thrust force generated at the magnet portion 36 by a magnetic attractive force arising from magnetic flux which is generated around the magnet portion 36 by energization to the coil 34. FIG. 1 shows the position of the movable element 16 when driving of the drive unit 18 is stopped, that is, supply of an input signal to the coil 34 (energization to the coil 34) is stopped. In the following description, the position at this time is referred to as a neutral position of the movable element 16.

Further, in the following description, the magnetic attractive force is an all-inclusive term of forces that act on the magnet portion 36 due to the magnetic flux generated around the magnet portion 36. Thus, the magnetic attractive force also includes a force arising from magnetic fluxes from the first permanent magnet 36a and the second permanent magnet 36b, and a force exerted on the magnet portion 36 due to energization to the coil 34.

The movable element 16 has the connector shaft 50 extending substantially coaxially with the central axis 14 in the X direction, the magnet portion 36 connected to the X2 direction side of the connector shaft 50, a spool 54 disposed in the sleeve 28 along the X direction substantially coaxially with the central axis 14 and connected to the X1 direction side of the connector shaft 50, and an annular first fixed portion 56 disposed on the magnet portion 36 side of the connector shaft 50. The first fixed portion 56 is fixed to the magnet portion 36 and the connector shaft 50.

An annular connecting portion 58 through which the connector shaft 50 penetrates is disposed movably in the X direction in a large diameter portion 20b of the hole portion 20 on the X2 direction side. Further, in the large diameter portion 20b, there is provided an annular second fixed portion 60 through which the connector shaft 50 and the first fixed portion 56 penetrate and which is fixed to an inner peripheral surface of the valve body 12 and an end portion of the side yoke 32a on the X1 direction side.

Further, the large diameter portion 20b is provided with a first elastic portion 62 which has one end fixed to the first fixed portion 56 and the other end connected to the connecting portion 58. The first elastic portion 62 is a spring member such as a compression coil spring or the like extending in the X direction between the first fixed portion 56 and the connecting portion 58 so as to surround the connector shaft 50, and has a first elastic force acting on the drive unit 18 side in the X2 direction. That is, the first elastic portion 62 in a compressed state in the X direction is interposed between the first fixed portion 56 and the connecting portion 58, whereby the first elastic force is generated to press the movable element 16 including the first fixed portion 56 toward the X2 direction.

Still furthermore, the large diameter portion 20b is provided with a second elastic portion 64 which has one end fixed to the second fixed portion 60 and the other end connected to the connecting portion 58. The second elastic portion 64 is a spring member such as a compression coil spring or the like extending in the X direction between the second fixed portion 60 and the connecting portion 58 so as to surround the connector shaft 50 and the first elastic portion 62, and has a second elastic force acting toward the X1 direction away from the drive unit 18. That is, the second elastic portion 64 in a compressed state in the X direction is interposed between the second fixed portion 60 and the connecting portion 58, whereby the second elastic force is generated to press the connecting portion 58 toward the X1 direction.

In this way, the first elastic portion 62 and the second elastic portion 64 are arranged so that the direction (X2 direction) in which the first elastic force acts and the direction (X1 direction) in which the second elastic force acts are mutually different from each other. Incidentally, in the present embodiment, the first elastic portion 62 and the second elastic portion 64 may be arbitrarily arranged as long as they have elastic forces acting in mutually different directions along the X direction. Further, the connecting portion 58 and the first fixed portion 56 function as spring seats (spring guides) for the first elastic portion 62. Furthermore, the connecting portion 58 and the second fixed portion 60 function as spring seats (spring guides) for the second elastic portion 64.

As mentioned above, FIG. 1 shows the state of the servo valve 10 when the movable element 16 is at the neutral position. At this neutral position, by the second elastic force of the second elastic portion 64, the connecting portion 58 is held in abutment against a step portion 66 between the large diameter portion 20b and the small diameter portion 20c of the hole portion 20 on the inner peripheral surface of the valve body 12, an end portion of the sleeve 28 on the X2 direction side, and an end portion of the spool 54 on the X2 direction side. However, since the connecting portion 58 abuts against the step portion 66 and thereby is restrained from moving in the X1 direction, the second elastic force is not exerted on the sleeve 28 and the spool 54.

Further, at the neutral position, the first elastic force of the first elastic portion 62 acts on the first fixed portion 56. However, if the first elastic force and the second elastic force are adjusted to balance with each other, the load imposed on the movable element 16 becomes zero in total. Accordingly, in the following description, the forces (the first elastic force and the second elastic force) exerted on the movable element 16 at the neutral position are also referred to as an initial load.

Furthermore, at the neutral position, the spool 54 blocks the communications between the ports 24 and the hole portion 20 (the connections of flow passages between the ports 24). That is, the servo valve 10 shown in FIG. 1 is a servo valve having the function of a closed center. Further, the magnet portion 36 is located between the two protruding portions 40a, 40b. That is, the position of the second yoke 36c, which is a center position of the magnet portion 36 in the X direction, and the center position of the coil 34 in the X direction are substantially the same position.

2. OPERATION OF SERVO VALVE 10

The operation of the servo valve 10 as constructed above will be described with reference to FIG. 2A to FIG. 6. Incidentally, this description of operation will be made with reference also to FIG. 1 as necessary.

Here, description will be made regarding a case that the movable element 16 is slid toward the X2 direction as shown in FIG. 2B and FIG. 3S from the neutral position shown in FIG. 2A and FIG. 3A and a case that the movable element 16 is slid toward the X1 direction as shown in FIG. 2C and FIG. 3C. Incidentally, FIG. 2A to FIG. 2C are schematic diagrams each schematically illustrating the operation of the movable element 16 disposed in the hole portion 20 of the valve body 12. FIG. 3A to FIG. 3C are schematic diagrams each schematically illustrating the operation of the magnet portion 36 constituting the movable element 16.

First of all, at the neutral position shown in FIG. 2A and FIG. 3A, the connecting portion 58 is pressed by the second elastic force of the second elastic portion 64 against the step portion 66 inside the valve body 12. Thus, movement of the connecting portion 58 toward the X1 direction is restrained, and the position of the second elastic portion 64 is regulated in the large diameter portion 20b. As a result, even when the connecting portion 58 abuts against the movable element 16 (the spool 54 shown in FIG. 1), the second elastic force is not exerted on the movable element 16. Further, if the first elastic force and the second elastic force are adjusted to be in balance with each other at the neutral position, an initial load exerted on the movable element 16 becomes zero in total.

On the other hand, as schematically shown in FIG. 3A, at the neutral position, the second yoke 36c of the magnet portion 36 and the coil 34 are disposed at substantially the same position in the X direction. Thus, with respect to this position, the magnet portion 36, the coil 34 and the first yoke 32 are arranged substantially symmetrically. Thus, the first permanent magnet 36a faces the first protruding portion 40a, and the second permanent magnet 36b faces the second protruding portion 40b.

As a result, as indicated by the black arrows in FIG. 3A, the magnetic attractive force is generated from the first permanent magnet 36a to the first protruding portion 40a due to the magnetic flux of the first permanent magnet 36a, and the magnetic attractive force is generated from the second permanent magnet 36b to the second protruding portion 40b due to the magnetic flux of the second permanent magnet 36b.

However, as mentioned before, because the magnet portion 36, the coil 34 and the first yoke 32 are symmetrically arranged, these magnetic attractive forces are in balance with each other, and the movable element 16 including the magnet portion 36 does not move in the X direction. As a result, as shown in FIG. 2A, the movable element 16 is positioned in a state that the connecting portion 58 is in abutment against the X1 direction side (the spool 54 shown in FIG. 1) of the movable element 16. Thus, at the neutral position, as shown in FIG. 1, the spool 54 is able to block the communications between the plurality of ports 24 and the hole portion 20 (the connections of flow passages between the ports 24).

Next, description will be made regarding a case that the coil 34 is supplied with an input signal from the outside to thereby be brought into the energized state whereby the movable element 16 is slid toward the X2 direction as shown in FIG. 2B and FIG. 3B.

In this case, since an electric current based on the input signal flows across the coil 34, magnetic flux is generated around the magnet portion 36. This magnetic flux forms a magnetic path passing through the first yoke 32, the second yoke 36c and the like to thereby magnetize the first protruding portion 40a to N-pole and the second protruding portion 40b to S-pole. Thus, a repulsive force is generated between the first protruding portion 40a and the first permanent magnet 36a, while a magnetic attractive force indicated by the black arrow is generated between the second protruding portion 40b and the second permanent magnet 36b. As a result, due to the magnetic attractive force and the repulsive force, a thrust force toward the X2 direction indicated by the outlined arrow is generated on the magnet portion 36 (the second yoke 36c). Accordingly, as shown in FIG. 2B, the movable element 16 is able to slide toward the X2 direction together with the connecting portion 58 against the second elastic force of the second elastic portion 64 toward the X1 direction.

On the other hand, when the energization to the coil 34 is discontinued in a case that the movable element 16 is moved toward the X2 direction, the magnetic attractive force by the energization to the coil 34 disappears, and consequently the thrust force becomes zero. As a result, the second elastic force functions as a restoring force toward the neutral position, whereby the movable element 16 and the connecting portion 58 are returned to the neutral position shown in FIG. 2A along the X1 direction.

Next, description will be made regarding a case that the coil 34 is energized to slide the movable element 16 toward the X1 direction as shown in FIG. 2C and FIG. 3C.

Also in this case, since an electric current based on an input signal flows across the coil 34, magnetic flux is generated around the magnet portion 36. The magnetic flux forms a magnetic path passing through the first yoke 32, the second yoke 36c and the like to thereby magnetize the first protruding portion 40a to S-pole and the second protruding portion 40b to N-pole. Thus, a magnetic attractive force indicated by the black arrow is generated between the first protruding portion 40a and the first permanent magnet 36a, while a repulsive force is generated between the second protruding portion 40b and the second permanent magnet 36b. As a result, due to the magnetic attractive force and the repulsive force, a thrust force toward the X1 direction indicated by the outlined arrow is generated on the magnet portion 36 (the second yoke 36c). Accordingly, as shown in FIG. 2C, the movable element 16 is able to slide toward the X1 direction against the first elastic force of the first elastic portion 62 toward the X2 direction. Incidentally, since the connecting portion 58 is in abutment against the step portion 66, the movable element 16 slides alone toward the X1 direction.

On the other hand, when the energization to the coil 34 is discontinued in a case that the movable element 16 is moved toward the X1 direction, the magnetic attractive force due to the energization to the coil 34 disappears, the thrust force becomes zero. As a result, the first elastic force functions as a restoring force toward the neutral position, whereby the movable element 16 is returned to the neutral position shown in FIG. 2A along the X2 direction.

Figure 4:
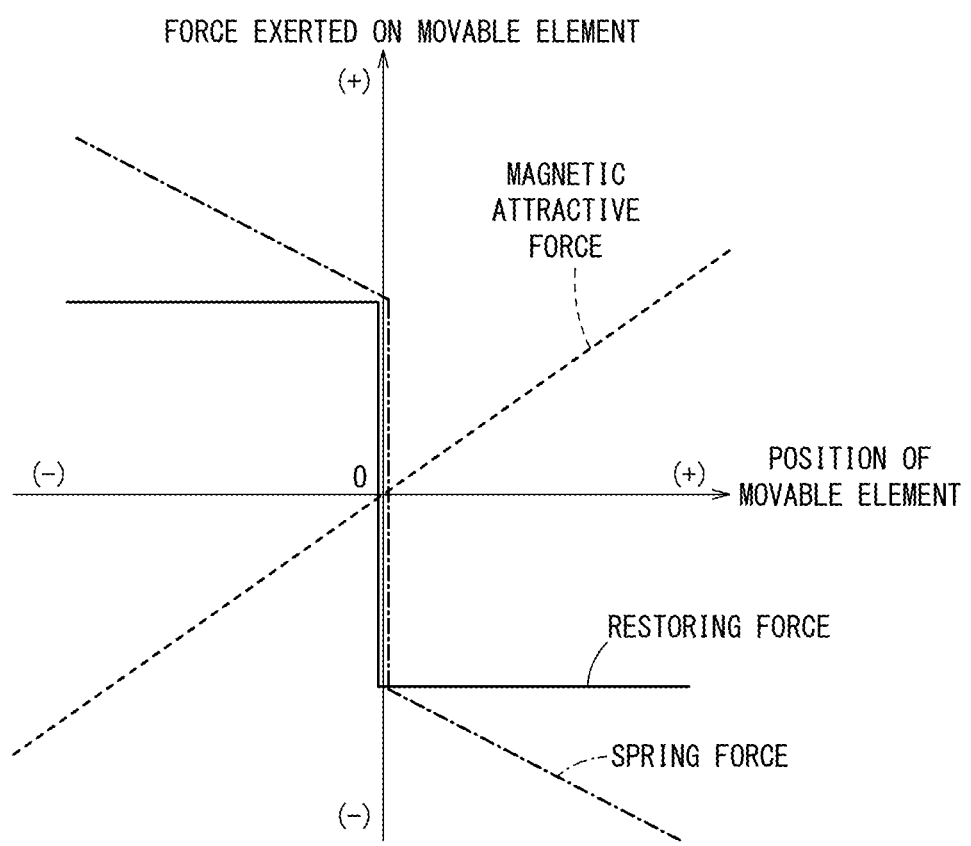
FIG. 4 is a graph showing a relationship between the position of the movable element shown in FIG. 1 and the force exerted on the movable element.

FIG. 4 is a graph illustrating a relationship between the position of the movable element 16 and the force exerted on the movable element 16. The horizontal axis represents the position of the movable element 16. In this case, the neutral position shown in FIG. 1 and FIG. 2A is set to zero, and the X2 direction side and the X1 direction side relative to the neutral position (0) are defined respectively as a positive direction and a negative direction. Furthermore, the vertical axis represents the force exerted on the movable element 16. In this case, the force exerted on the movable element 16 in the X2 direction is defined as the force in the positive direction, while the force exerted in the X1 direction is defined as the force in the negative direction.

In the case shown in FIG. 3B and FIG. 3O, the magnetic attractive force indicated by the broken line in FIG. 4 is exerted on the magnet portion 36. Here, a magnetic attractive force which causes the movable element 16 including the magnet portion 36 to slide toward the positive direction (X2 direction) is generated in the case shown in FIG. 3B. On the other hand, a magnetic attractive force which causes the movable element 16 to slide toward the negative direction (X1 direction) is generated in the case shown in FIG. 3O.

Further, as shown in FIG. 3B, when the magnet portion 36 is moved toward the X2 direction from the position of the magnet portion 36 at the neutral position, the magnetic attractive force becomes larger as the second permanent magnet 36b comes closer to the second protruding portion 40b. On the other hand, as shown in FIG. 3O, when the magnet portion 36 is moved toward the X1 direction from the position of the magnet portion 36 at the neutral position, the magnetic attractive force becomes larger as the first permanent magnet 36a comes closer to the first protrusion portion 40a.

Therefore, as shown in FIG. 4, the magnetic attractive force becomes larger from zero toward the positive direction as the movable element 16 moves further from the neutral position (0) toward the positive direction (X2 direction). On the other hand, the magnetic attractive force becomes larger from zero toward the negative direction as the movable element 16 moves further from the neutral position (0) toward the negative direction (X1 direction). Consequently, the magnetic attractive force becomes linearly larger toward the positive direction or the negative direction in proportion to a deviation amount from the neutral position.

Further, the first elastic force and the second elastic force shown in FIG. 2A to FIG. 2C are exerted on the movable element 16. In FIG. 4, the elastic force (spring force) which acts from the first elastic portion 62 and the second elastic portion 64 on the movable element 16 is shown by a dot-and-dash line.

In the case of FIG. 2B, as the movable element 16 slides toward the positive direction (X2 direction), the second elastic force which is exerted on the movable element 16 toward the negative direction (X1 direction) indicated by the black arrow in FIG. 2B becomes larger. On the other hand, in the case of FIG. 2C, as the movable element 16 slides toward the negative direction (X1 direction), the first elastic force which is exerted on the movable element 16 toward the positive direction (X2 direction) indicated by the black arrow in FIG. 2C becomes larger.

Incidentally, at the neutral position shown in FIG. 2A, the first elastic portion 62 presses the X2 direction side of the movable element 16 toward the X2 direction by the first elastic force, while the second elastic portion 64 presses the X1 direction side of the movable element 16 toward the X1 direction by the second elastic force through the connecting portion 58. As a result, as shown in FIG. 4, at the neutral position (0), because an initial load (the first elastic force) toward the positive direction balances with an initial load (the second elastic force) toward the negative direction, the movable element 16 is placed in a no-load state in which no load is exerted on the movable element 16 in total.

Then, as the movable element 16 moves from the neutral position (0) toward the positive direction (X2 direction), the spring force is increased by the second elastic force from the initial load toward the negative direction. On the other hand, as the movable element 16 moves from the neutral position (0) toward the negative direction (X1 direction), the spring force is increased by the first elastic force toward the positive direction from the initial load toward the positive direction. That is, the spring force increases toward the positive direction or the negative direction in proportion to a deviation amount from the neutral position.

Therefore, in the servo valve 10 according to the present embodiment, the restoring force (the force for return the valve to the neutral position) exerted on the movable element 16 can be adjusted by balancing the magnetic attractive force with the mechanical spring force. Specifically, as shown by the solid line in FIG. 4, it is preferable to set the restoring force to a fixed value regardless of the position of the movable element 16 by balancing the magnetic attractive force with the mechanical spring force. Thus, it is possible to improve the controllability of the position of the movable element 16.

Figure 5:
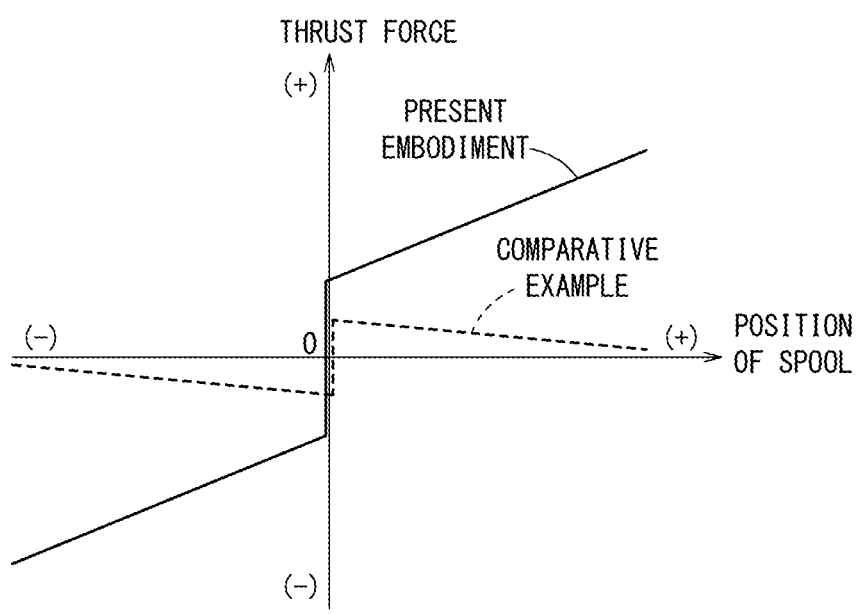
FIG. 5 is a graph showing a relationship between the position of a spool and thrust force.

FIG. 5 shows a relationship between the thrust force generated on the magnet portion 36 and the position of the spool 54 (the movable element 16). Incidentally, the horizontal axis represents the position of the spool 54 and as in FIG. 4, the X2 direction is defined as the positive direction, while the X1 direction is defined as the negative direction. The vertical axis represents the thrust force generated on the movable element 16 including the magnet portion 36 and as in FIG. 4, the X2 direction is defined as the positive direction, while the X1 direction is defined as the negative direction.

As mentioned above, because the initial load toward the positive direction or the negative direction exists, it is necessary to generate a thrust force exceeding the initial load in sliding the movable element 16.

To this end, in the servo valve 10 according to the present embodiment, as shown in FIG. 1 and FIG. 3A to FIG. 3C, the first protruding portion 40a and the second protruding portion 40b are provided to face respectively the first permanent magnet 36a and the second permanent magnet 36b, and thus, the magnetic attractive force becomes larger as the first permanent magnet 36a comes closer to the first protruding portion 40a or as the second permanent magnet 36b comes closer to the second protruding portion 40b.

Therefore, as shown by the solid line in FIG. 5, it is possible to easily generate a thrust force capable of moving the movable element 16 from the neutral position toward the X1 direction or the X2 direction against the initial load. Incidentally, the characteristic of the thrust force shown in FIG. 5 has a characteristic that is symmetrical to the characteristic of the spring force indicated by the dot-and-dash line in FIG. 4 with respect to the neutral position (0). Further, in FIG. 5, the characteristic of the thrust force in the servo valves of Document 1 and Document 2 is shown by the dotted line as a comparative example.

FIG. 6 is a graph showing a relationship between the magnetic flux density detected by the magnetic sensor 48 (refer to FIG. 1) and the position of the movable element 16. Incidentally, FIG. 6 shows as one example a case that the movable element 16 (the magnet portion 36) slides from the neutral position toward the X1 direction.

The magnetic sensor 48 is able to detect magnetic flux density and output a detection signal corresponding to the detected magnetic flux density to the outside regardless of the presence or absence of the energization to the coil 34. In the servo valve 10, no magnetic body exists between the magnet portion 36 and the magnetic sensor 48. Thus, if the relationship between the magnetic flux density detected by the magnetic sensor 48 and the position of the movable element 16 (the magnet portion 36) is measured in advance, the position of the movable element 16 can easily be grasped from the magnetic flux detected by the magnetic sensor 48 when the movable element 16 is actually slid in the X direction relative to the neutral position by the energization to the coil 34, and hence, it is possible to control the input signal supplied to the coil 34 depending on the position of the movable element 16.

COMPARISON OF PRESENT EMBODIMENT WITH DOCUMENTS 3 TO 5

Next, with reference to FIG. 7A to FIG. 13, the characteristic of the servo valve 10 according to the present embodiment will be compared with characteristics of the servo valves in Documents 3 to 5. Here, the same components as those in the servo valve 10 will be denoted by the same reference numerals.

Figure 7A:
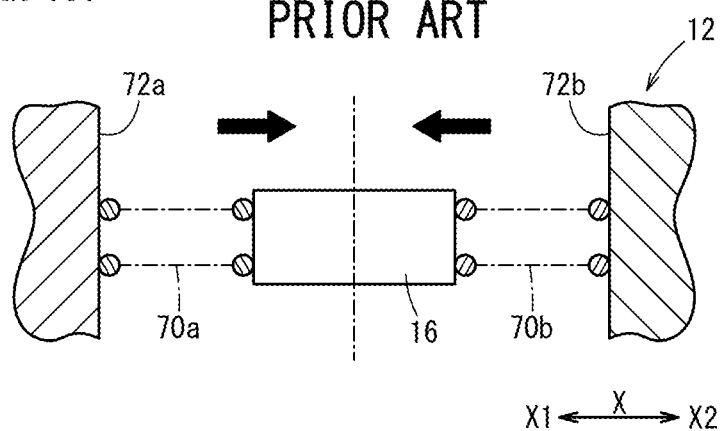
FIG. 7A to FIG. 7C are schematic diagrams each showing the movement of a movable element in a servo valve of Document 3.
Figure 7B:
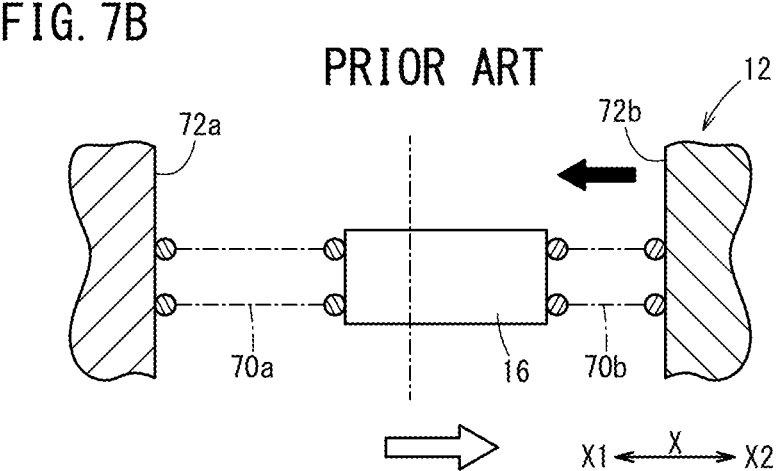
Figure 7C:
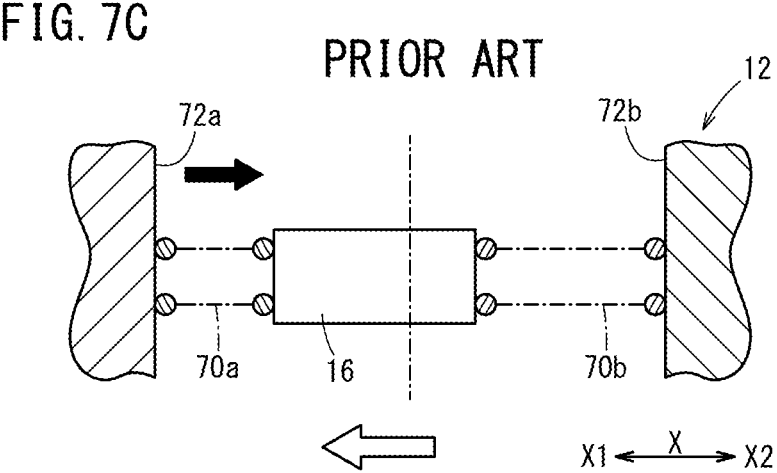
Figure 8:
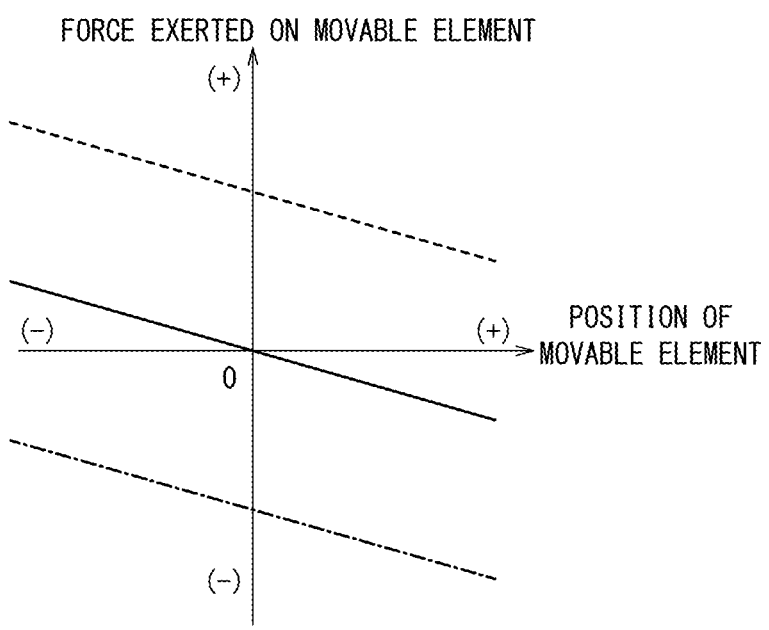
FIG. 8 is a graph showing a relationship between the position of the movable element and the force exerted on the movable element in the servo valve of Document 3.

FIG. 7A to FIG. 8 show a case of the servo valve in Document 3.

FIG. 7A to FIG. 7C schematically show the construction of this servo valve. FIG. 7A shows a neutral position, FIG. 7B shows a case that a movable element 16 is moved toward the X2 direction, and FIG. 7C shows a case that the movable element 16 is moved toward the X1 direction.

In Document 3, one end of the movable element 16 on the X1 direction side is connected to a fixed surface 72a of the valve body 12 or the like on the X1 direction side through a spring member 70a, while the other end of the movable element 16 on the X2 direction side is connected to a fixed surface 72b on the X2 direction side of the valve body 12 or the like through a spring member 70b. In this case, the two spring members 70a, 70b that are in a compressed state are provided between the movable element 16 and the fixed surfaces 72a, 72b. Thus, when the movable element 16 is at the neutral position shown in FIG. 7A, the spring members 70a, 70b on the both sides exert the elastic forces indicated by the black arrows on the movable element 16. Since these elastic forces are applied in mutually opposite directions, the forces exerted on the movable element 16 are balanced.

As the movable element 16 slides from the neutral position toward the X2 direction, as shown in FIG. 7B, the force exerted on the movable element 16 from the spring member 70a on the X1 direction side decreases, while the force exerted on the movable element 16 from the spring member 70b on the X2 direction side increases. Further, when the movable element 16 slides from the neutral position toward the X1 direction, as shown in FIG. 7C, the force exerted on the movable element 16 from the spring member 70a on the X1 direction side increases, while the force exerted on the movable element 16 from the spring member 70b on the X2 direction side decreases.

FIG. 8 is a graph showing variations of the forces exerted on the movable element 16 from the two spring members 70a, 70b with respect to the position of the movable element 16. In FIG. 8, the broken line represents the force exerted on the movable element 16 from the spring member 70a on the X1 direction side, the dot-and-dash line represents the force exerted on the movable element 16 from the spring member 70b on the X2 direction side, and the solid line represents the total force exerted on the movable element 16. As shown in FIG. 8, the total force exerted on the movable element 16 varies linearly with respect to the position of the movable element 16, wherein no force is exerted on the movable element 16 at the neutral position (0). That is, the force toward the negative direction (X1 direction) increases as the movable element 16 slides toward the X2 direction, while the force toward the positive direction (X2 direction) increases as the movable element 16 slides toward the X1 direction.

FIG. 9A to FIG. 11 show a case of a servo valve in Document 4.

Figure 9A:
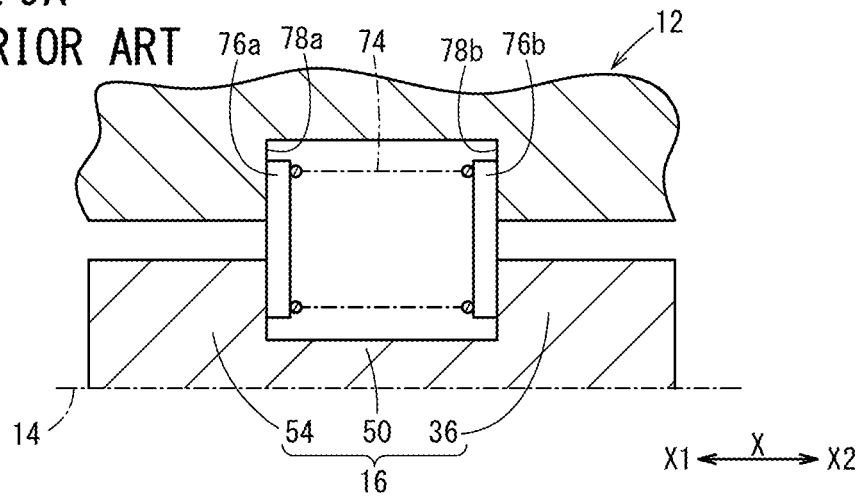
FIG. 9A to FIG. 9C are schematic diagrams showing the movement of a movable element in a servo valve of Document 4.
Figure 9B:
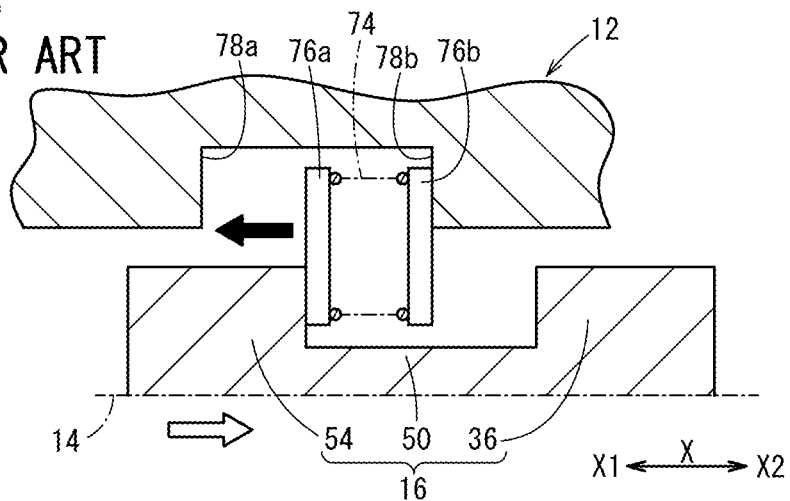
Figure 9C:
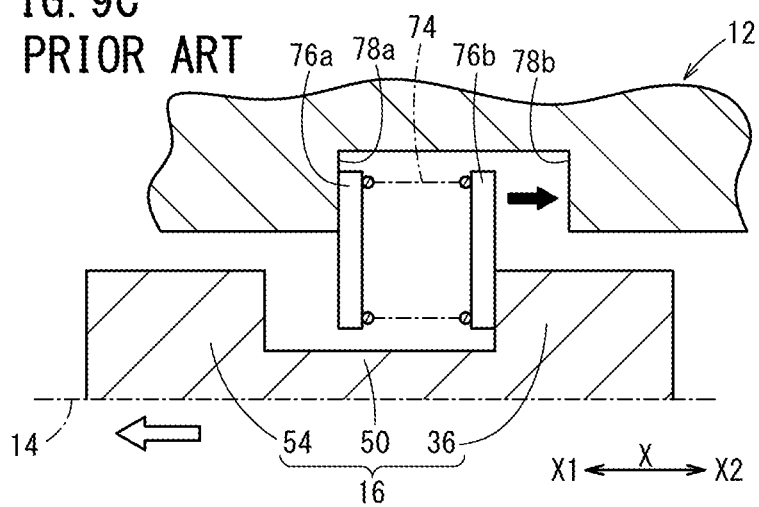

FIG. 9A to FIG. 9C schematically show the construction of this servo valve. FIG. 9A shows the neutral position, FIG. 9B shows a case that a movable element 16 is moved toward the X2 direction, and FIG. 9C shows a case that the movable element 16 is moved toward the X1 direction. Document 4 differs from the servo valve 10 (refer to FIG. 1 to FIG. 6) according to the present embodiment in that one spring member 74 is disposed in the X direction between one end portion of the movable element 16 on the X1 direction side (spool 54) and the other end portion thereof on the X2 direction side (magnet portion 36) and that the opposite ends of the spring member 74 are fixed to two respective fixing portions 76a, 76b. Incidentally, the two fixing portions 76a, 76b are movable in the X direction.

In this case, at the neutral position shown in FIG. 9A, the two fixing portions 76a, 76b serving as spring seats are pressed by the elastic force of the spring member 74 respectively on a fixed surface 78a of the valve body 12 or the like on the X1 direction side and a fixed surface 78b thereof on the X2 direction side. Thus, movements of the two fixing portions 76a, 76b in the X direction are restrained. As a result, even when the one end portion and the other end portion of the movable element 16 abut against the two fixing portions 76a, 76b, no load is exerted on the movable element 16 in the X direction.

Then, when the movable element 16 slides from the neutral position toward the X2 direction, the elastic force exerted on the movable element 16 toward the negative direction (X1 direction) as indicated by the black arrow in FIG. 9B increases. On the other hand, when the movable element 16 slides from the neutral position toward the X1 direction, the elastic force exerted on the movable element 16 toward the positive direction (the X2 direction) as indicated by the black arrow in FIG. 9C increases.

Figure 11:
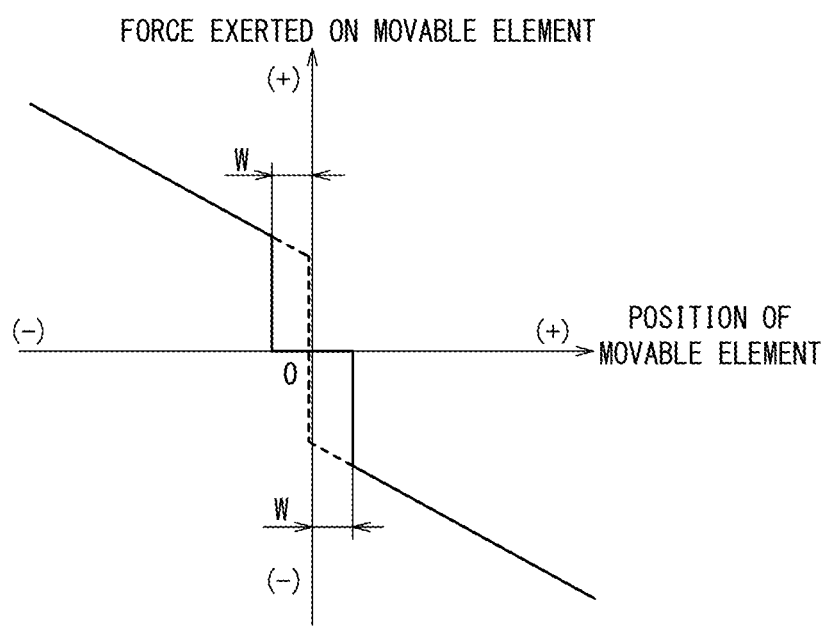
FIG. 11 is a graph showing a relationship between the position of the movable element and the force exerted on the movable element in the servo valve of Document 4.

For this reason, in Document 4, since as shown in FIG. 11, initial loads toward the positive direction and the negative direction are balanced with each other at the neutral position (0), the total load exerted on the movable element 16 becomes zero ideally. On the other hand, as the movable element 16 moves further away from the neutral position, the force exerted on the movable element 16 increases toward the positive direction or the negative direction.

Figure 10A:
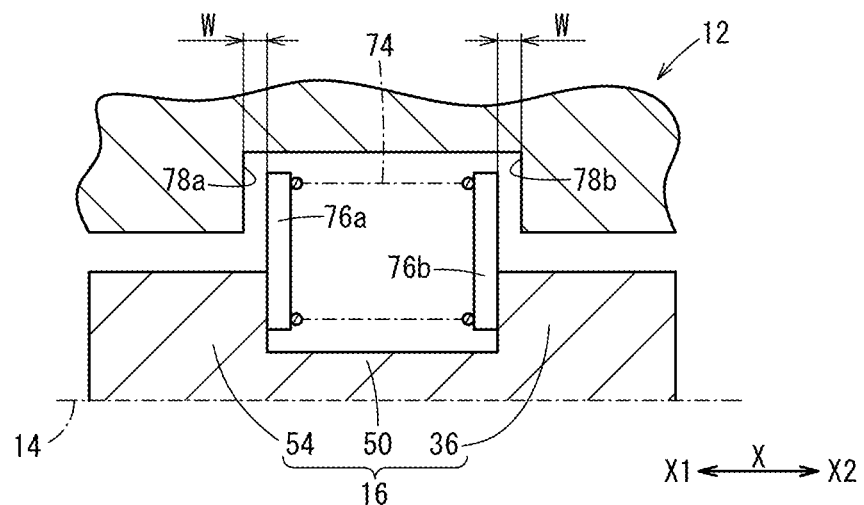
FIG. 10A and FIG. 10B are schematic diagrams each showing the movement of the movable element in the servo valve of Document 4.
Figure 10B:
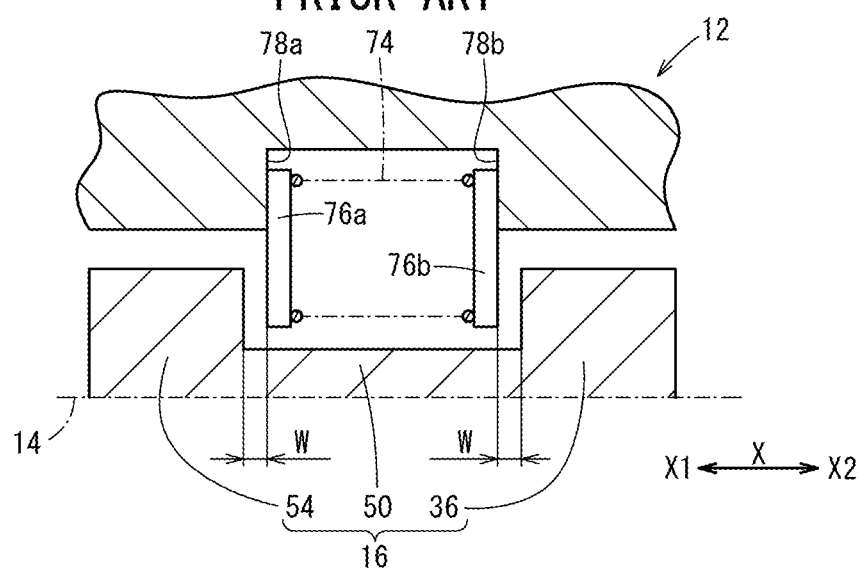

However, if the spool 54 of the movable element 16 has looseness or backlash caused by the dimensional tolerance or the like, as shown in FIG. 10A and FIG. 10B, gaps W are produced between the fixing portions 76a, 76b and the fixed surfaces 78a, 78b at the neutral position, or gaps W are produced between the fixing portions 76a, 76b and the movable element 16. Thus, the movable element 16 is liable to be displaced in the X direction at the neutral position. As a result, the actual characteristic of the force exerted on the movable element 16 is affected by the gaps W, and as indicated by the solid line in FIG. 11, becomes a characteristic in which the initial loads are generated at positions deviated from the neutral position. Consequently, in the servo valve of Document 4, it is impossible to control the position of the movable element 16 precisely.

Figure 12:
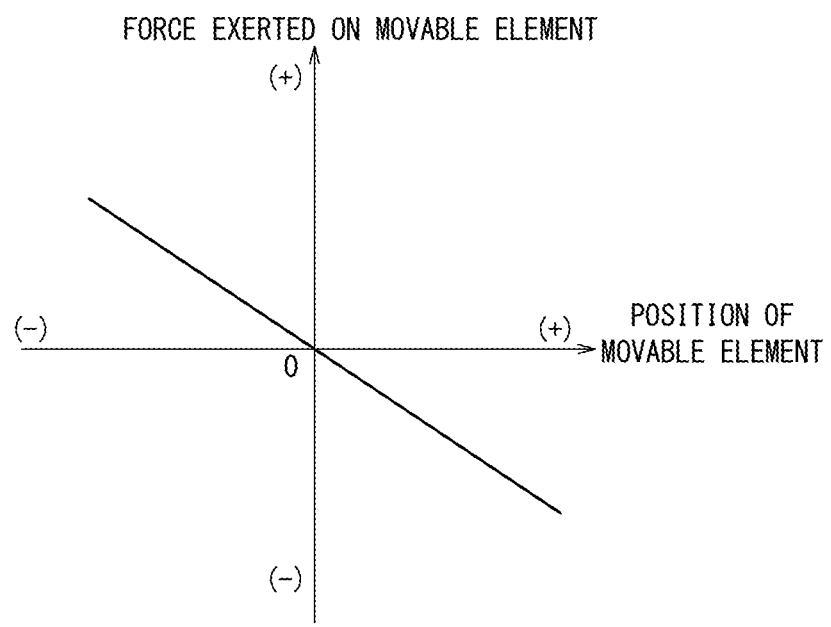
FIG. 12 is a graph showing a relationship between the position of a movable element and the force exerted on the movable element in a servo valve of Document 5.

FIG. 12 is a graph showing a relationship between the position of a movable element 16 and the force exerted on the movable element 16 in a servo valve in Document 5.

In this servo valve, the magnetic force of a permanent magnet is used as a restoring force for the movable element 16 (spool 54). Thus, as shown in FIG. 12, the force exerted on the movable element 16 has a linear characteristic where the force increases toward the positive direction or the negative direction as the movable element 16 moves farther from the neutral position. Thus, since the force of a magnetic spring around the neutral position becomes weak, the movable element 16 is liable to be displaced due to an impact or vibration from the outside.

Figure 13:
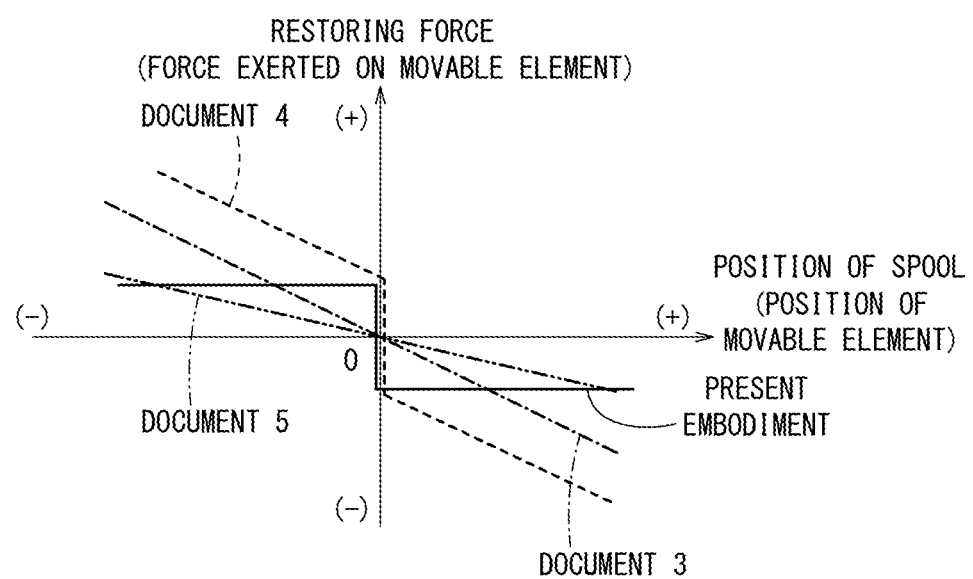
FIG. 13 is a graph comparing relationships between the positions of the movable elements and the forces exerted on the movable elements in the servo valve according to the present embodiment and the servo valves of Documents 3 to 5.

FIG. 13 is a graph which, concerning a force (restoring force toward the neutral position) exerted on the movable element 16, shows the result of the present embodiment (solid line) shown in FIG. 4 together with the results of Documents 3 to 5 shown in FIG. 8, FIG. 11 and FIG. 12 (Document 3: dot-and-dash line, Document 4: broken line, and Document 5: two-dot chain line). As shown in FIG. 13, in Documents 3 to 5, the movable element 16 is displaced when an impact or vibration is externally applied to the servo valve in the vicinity of the neutral position, or the movable element 16 cannot be controlled precisely due to backlash of the movable element 16.

In contrast, in the present embodiment, the force exerted on the movable element 16 is kept at a predetermined value even when the position of the movable element 16 is changed toward the positive direction or the negative direction. Thus, the position of the movable element 16 can be controlled precisely in comparison with the cases of Documents 3 to 5.

4. MODIFICATIONS OF THE PRESENT EMBODIMENT

Next, modifications of the servo valve 10 according to the present invention will be described.

In the present embodiment, the closed center servo valve 10 has been described in which, as shown in FIG. the connections of flow passages between the ports 24 are blocked at the neutral position. The present invention is not limited to the aforementioned description and may be an exhaust center servo valve in which output ports communicate with exhaust ports at the neutral position, or a pressure center servo valve in which output ports communicate with a supply port at the neutral position.

Further, in the present embodiment, description has been made regarding the servo valve 10 having the movable portion (magnet portion 36) of the movable magnet type, as shown in FIG. 1. The servo valve 10 according to the present invention is not limited to the aforementioned description and may be a servo valve having a movable portion 80 of a movable coil type shown in FIG. 14A to FIG. 14C or a servo valve having a movable portion 82 of a movable iron core type shown in FIG. 15A to FIG. 15C. Incidentally, FIG. 14A to FIG. 15C schematically show the constructions of respective drive units 18.

Figure 14A:
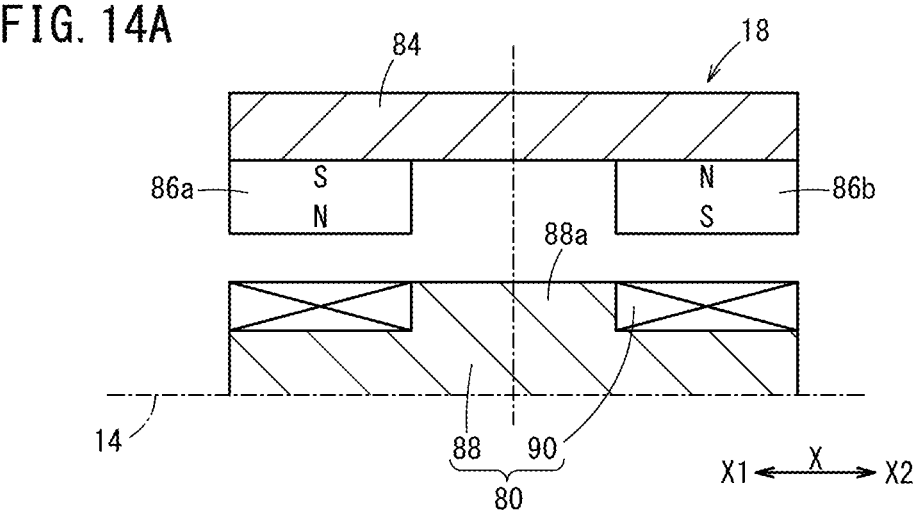
FIG. 14A to FIG. 14C are schematic diagrams each showing the movement of a movable portion of a movable coil type.
Figure 14B:
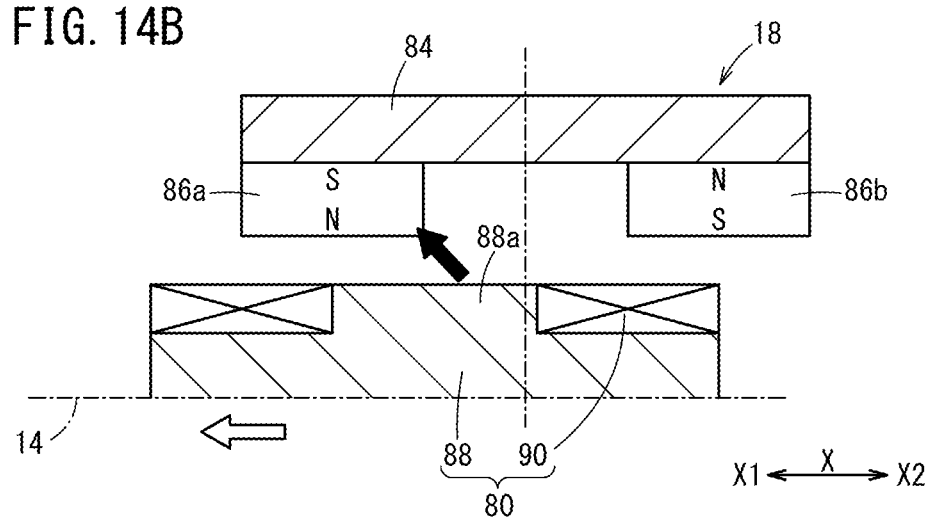
Figure 14C:
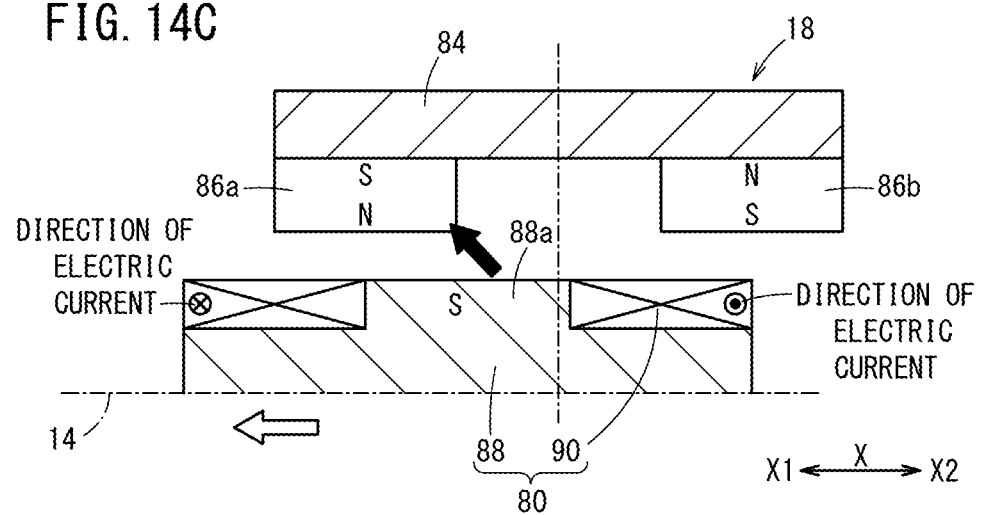

In the case of FIG. 14A to FIG. 14C, the drive unit 18 of the servo valve 10 (refer to FIG. 1) has a tubular yoke 84 connected to the end portion of the valve body 12 on the X2 direction side, two permanent magnets 86*a*, 86*b* provided at respective opposite ends of the yoke 84 in the X direction so as to protrude inward, and a movable portion 80 provided in the X direction inside the yoke 84 and constituting a portion of the movable element 16. The movable portion 80 has an iron core 88 disposed substantially coaxially with the central axis 14 inside the yoke 84 so as to face the yoke 84, and a coil 90 wound around the iron core 88. In this case, a protruding portion 88*a* protruding toward the yoke 84 is formed on a center portion of the iron core 88, and the coil 90 is arranged on the iron core 88 by being wound around the protruding portion 88*a*.

FIG. 14A shows positioning of the drive unit 18 at the neutral position. In this case, it is desirable that the center position of the protruding portion 88*a* of the iron core 88 in the X direction be substantially in agreement with a middle position between the two permanent magnets 86*a*, 86*b*. Further, it is desirable that the yoke 84 be provided so as to cover the movable portion 80 within a moving range of the movable portion 80.

Here, as one example, a case will be described that the movable element 16 (refer to FIG. 1) including the movable portion 80 is slid toward the X1 direction. In a case where the two permanent magnets 86*a*, 86*b* are magnetized as shown in FIG. 14A, the magnetic flux from the permanent magnet 86*a* forms a magnetic path which passes through the yoke 84, the protruding portion 88*a* and the like. Thus, a magnetic attractive force indicated by the black arrow in FIG. 14B is generated due to the magnetic flux at the movable portion 80. As a result, the magnetic attractive force causes a thrust force to be generated toward the X1 direction indicated by the outlined arrow, whereby the movable element 16 is slid toward the X1 direction against the first elastic force of the first elastic portion 62 toward the X2 direction (see FIG. 2C).

Further, as shown in FIG. 14C, when the magnetic flux is generated around the movable portion 80 by energization to the coil 90, the magnetic flux forms a magnetic path passing through the iron core 88 including the protruding portion 88*a* and the like, and thus, the protruding portion 88*a* is magnetized to be S-pole. Therefore, the magnetic attractive force exerted on the movable portion 80 further increases, and the thrust force toward the X1 direction increases accordingly. Consequently, the movable element 16 is easily slid toward the X1 direction (refer to FIG. 2C).

On the other hand, when the energization to the coil 90 is discontinued in a case that the movable element 16 is moved toward the X1 direction, the magnetic attractive force decreases. Thus, the first elastic force serves as a restoring force toward the neutral position, and hence, the movable element 16 can be returned to the neutral position shown in FIG. 2A along the X2 direction.

Figure 15A:
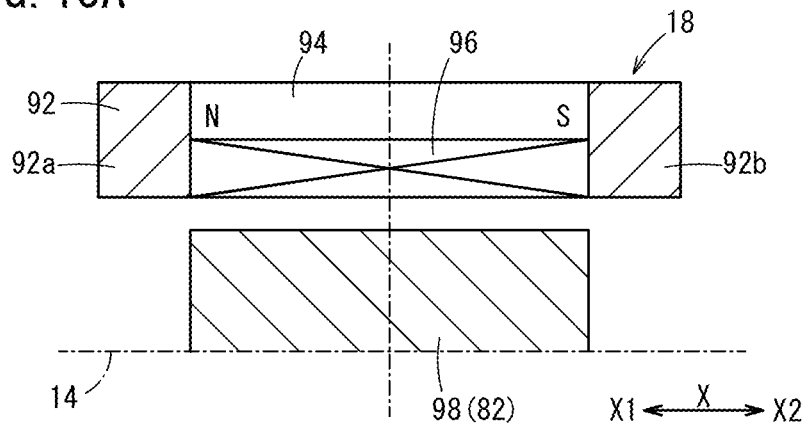
FIG. 15A to FIG. 15C are schematic diagrams each showing the movement of a movable portion of a movable iron core type.
Figure 15B:
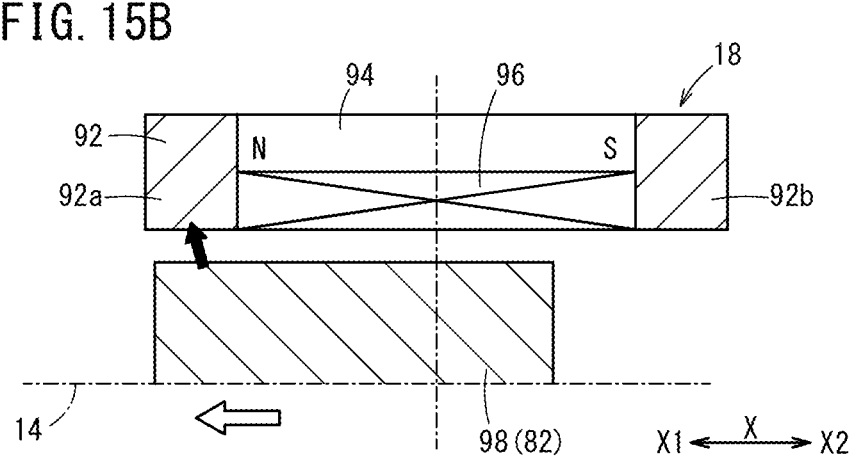
Figure 15C:
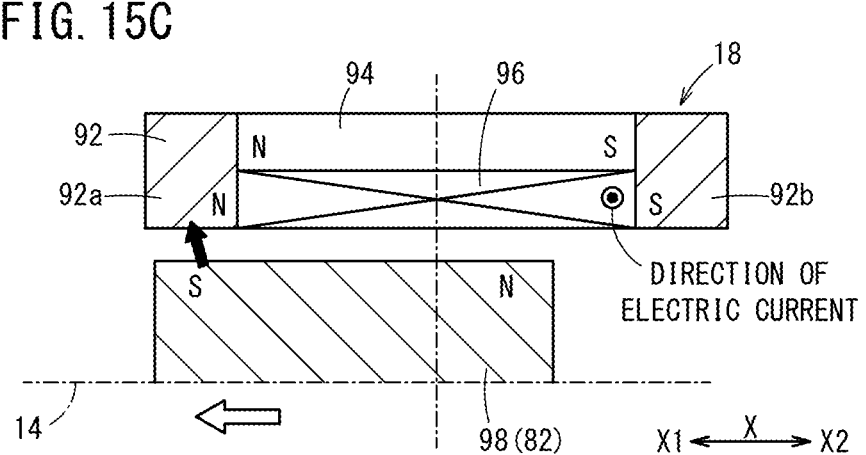

Further, in the case of FIG. 15A to FIG. 15C, the drive unit 18 of the servo valve 10 has a tubular yoke 92 connected to the end portion of the valve body 12 (see FIG. 1) toward the X2 direction, a permanent magnet 94 provided on a center portion of the yoke 92 in the X direction, a coil 96 provided in the X direction inside the yoke 92 so as to face the permanent magnet 94, and an iron core 98 (a movable portion 82 of the movable iron core type) provided in the X direction inside the yoke 92 so as to penetrate through the coil 96 and which constitutes a portion of the movable element 16. In this case, the coil 96 is disposed substantially coaxially with the central axis 14. Further, the iron core 98 is disposed substantially coaxially with the central axis 14 so as to penetrate through a hollow portion at the center of the coil 96.

FIG. 15A shows positioning of the drive unit 18 at the neutral position. In this case, it is desirable that the center position of the permanent magnet 94 (the center position of the yoke 92), the position of the coil 96 and the center position of the iron core 98 in the X direction be substantially in agreement with each other.

Here, as one example, a case will be described that the movable element 16 (see FIG. 1) including the iron core 98 is slid toward the X1 direction. If the permanent magnet 94 is magnetized as shown in FIG. 15A, magnetic flux from the permanent magnet 94 forms a magnetic path passing through a protruding portion 92*a* (the yoke 92), the iron core 98 and the like. Thus, a magnetic attractive force arising from the magnetic flux indicated by the black arrow in FIG. 155 is generated at the iron core 98. As a result, the magnetic attractive force causes a thrust force to be generated toward the X1 direction indicated by the outlined arrow, whereby the movable element 16 is slid toward the X1 direction against the first elastic force of the first elastic portion 62 toward the X2 direction (see FIG. 20).

Further, as shown in FIG. 15C, when magnetic flux is generated around the iron core 98 by energization to the coil 96, this magnetic flux forms a magnetic path passing through the iron core 98, the yoke 92 including the protruding portion 92*a* and the like, and thus, the protruding portions 92*a*, 92*b* and the both ends of the iron core 98 are each magnetized to N-pole or S-pole. Therefore, the magnetic attractive force exerted on the iron core 98 further increases, and accordingly the thrust force toward the X1 direction increases. As a result, the movable element 16 is easily slid toward the X1 direction (see FIG. 2C).

On the other hand, when the energization to the coil 96 is discontinued in a case that the movable element 16 is moved toward the X1 direction, the magnetic attractive force decreases. Thus, the first elastic force serves as a restoring force toward the neutral position, and thus, the movable element 16 can be returned to the neutral position shown in FIG. 2A along the X2 direction.

Figure 16:
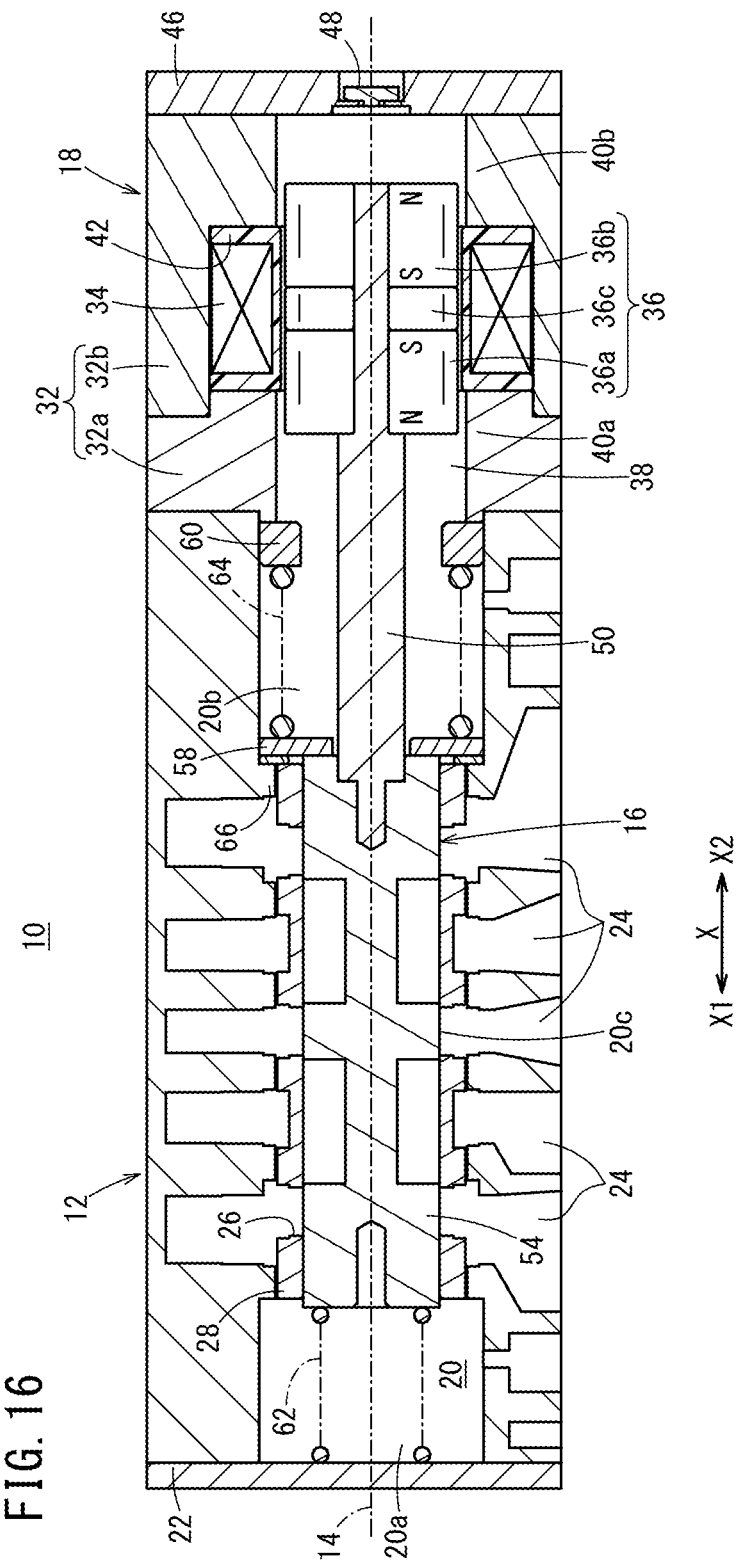
FIG. 16 is a cross sectional view of a servo valve according to a modification.

Further, it is possible to construct the servo valve 10 according to the present embodiment into a modification as shown in FIG. 16. This modification differs from the construction shown in FIG. 1 in that one end of a first elastic portion 62 is fixed to an end portion of the spool 54 on the X1 direction side while the other end of the first elastic portion 62 is fixed to the end cover 22 and that the first fixed portion 56 is omitted. Thus, the second elastic portion 64 only is connected to the connecting portion 58. In this case as well, the first elastic portion 62 presses the movable element 16 including the spool 54 toward the X2 direction. Thus, the modification is able to perform the same operation as that in the construction shown in FIG. 1.

FIG. 17 is a graph showing a relationship between the position of the movable element 16 and the force exerted on the movable element 16 in the modification shown in FIG. 16. In this case, a resultant force of the first elastic force and the second elastic force is a spring force, and a resultant force of the spring force and a magnetic attractive force is a restoring force. As mentioned before, the modification shown in FIG. 16 performs the same operation as the construction shown in FIG. 1. For this reason, also in FIG. 17, the restoring force is the same as that shown in FIG. 4. Accordingly, also in the modification shown in FIG. 16, it is possible to improve the controllability of the position of the movable element 16.

5. EFFECTS OF PRESENT EMBODIMENT

As described above, in the servo valve 10 according to the present embodiment, the first elastic portion 62 and the second elastic portion 64 have the elastic forces (the first elastic force and the second elastic force) that are applied in mutually different directions along the X direction.

Thus, at the neutral position of the movable element 16, the connecting portion 58 is pressed against a portion of the valve body 12 that faces the drive unit 18 (i.e., the step portion 66 on the X1 direction side in the large diameter portion 20b) and a portion of the movable element 16 that faces the drive unit 18 (i.e., the spool 54 on the X1 direction side in the large diameter portion 20b). Therefore, since the connecting portion 58 is restrained from moving toward the X1 direction, the position of the second elastic portion 64 is restrained in the interior (the large diameter portion 20b of the hole portion 20) of the valve body 12. As a result, the second elastic force is not exerted on the movable element 16, and thus, the movable element 16 is positioned on the neutral position at which the movable element 16 abuts against the connecting portion 58.

Next, when the movable element 16 is slid toward the drive unit 18 side (toward the X2 direction) by driving of the drive unit 18, the movable element 16 is slid together with the connecting portion 58 toward the X2 direction against the second elastic force. In this case, when driving of the drive unit 18 is stopped, the second elastic force serves as a restoring force, whereby the connecting portion 58 and the movable element 16 are returned to the neutral position along the X1 direction.

On the other hand, when the movable element 16 is slid in a direction away from the drive unit 18 (toward the X1 direction) by driving of the drive unit 18, the movable element 16 is slid toward the X1 direction against the first elastic force with the connecting portion 58 abutting against the step portion 66. In this case, when driving of the drive unit 18 is stopped, the first elastic force serves as a restoring force, whereby the movable element 16 is returned to the neutral position toward the X2 direction.

Accordingly, in the present embodiment, even in any of the case that the movable element 16 moves toward the X2 direction and the case that the movable element 16 moves toward the X1 direction, it is possible to stably perform the positioning control (the opening control of the plurality of ports 24) of the movable element 16 with respect to the neutral position. As a result, it is possible to realize the servo valve 10 having a satisfactory function of closed center, exhaust center or pressure center.

In this case, as with the construction shown in FIG. one end of the first elastic portion 62 is fixed to the first fixed portion 56 on the drive unit 18 side of the movable element 16, one end of the second elastic portion 64 is fixed to the second fixed portion 60 on the drive unit 18 side of the valve body 12, and the other end of the first elastic portion 62 and the other end of the second elastic portion 64 are connected to the connecting portion 58. Thus, with a simple construction, it is possible to improve controllability of positioning the movable element 16 with respect to the neutral position.

Further, in the servo valve 10, the drive unit 18 has the movable portion of the movable magnet type (the magnet portion 36 shown in FIG. 1 and FIG. 3A to FIG. 3C), the movable portion 80 of the movable coil type (refer to FIG. 14A to FIG. 14C), or the movable portion 82 (the iron core 98) of the movable iron core type (refer to FIG. 15A to FIG. 15C). Thus, it is possible to easily slide the movable element 16 in the X direction. Like this, even in any case of the movable magnet type, the movable coil type and the movable iron core type, it is possible to improve controllability in positioning the movable element 16.

Further, in the present embodiment, it is possible to adjust the restoring force for returning the movable element 16 to the neutral position by equilibrating the magnetic attractive force exerted on the movable element 16 from the drive unit 18 with the first elastic force or the second elastic force. Thus, it is possible to improve the positioning control of the movable element 16. In particular, if the magnetic attractive force is balanced with the first elastic force or the second elastic force to thereby adjust the restoring force so that the restoring force has a fixed value regardless of the position of the movable element 16 in the X direction, it is possible to further improve the positioning control of the movable element 16.

Here, if the servo valve 10 has the magnet portion 36, the magnetic flux is generated around the magnet portion 36 by energization to the coil 34, and the magnetic attractive force arising from the magnetic flux is applied on the magnet portion 36. As a result, it is possible to slide the movable element 16 including the magnet portion 36 in the X direction against the first elastic portion 62 or the second elastic portion 64. That is, the drive unit 18 functions as a linear motor for moving the magnet portion 36 in the X direction. Thus, since it is possible to easily control positioning of the movable element 16, it is possible to improve the responsiveness of the servo valve 10 with respect to an input signal supplied from the outside to the coil 34.

Further, since the first protruding portion 40a or the second protruding portion 40b constitutes a portion of the magnetic path of the magnetic flux when the coil 34 is energized, the magnet portion 36 is moved in the X direction, and the magnetic attractive force becomes larger as the magnet portion 36 comes closer to the first protruding portion 40a or the second protruding portion 40b. Further, by equilibrating the magnetic attractive force with the first elastic force or the second elastic force, as shown in FIG. 4 and FIG. 13, it is possible to keep the restoring force for returning the movable element 16 to the neutral position constant regardless of the position of the movable element 16. Accordingly, it is possible to improve the controllability of the servo valve 10 (the positioning control of the movable element 16, the responsiveness of the servo valve 10).

In this case, if the coil 34 is provided between the first protruding portion 40a and the second protruding portion 40b and if the position of the magnet portion 36 in the X direction and the position of the coil 34 in the X direction are set to be substantially the same when the movable element 16 is at the neutral position, then it is possible to further improve controllability of the servo valve 10.

Further, if the first yoke 32 is connected to the valve body 12 so as to cover the magnet portion 36 within the moving range within which the magnet portion 36 is moved in the X direction together with sliding of the movable element 16, it is possible to further improve the controllability of the servo valve 10.

Further, since the first yoke 32 is constructed by arranging the side yoke 32a and the outer yoke 32b with the coil 34 interposed therebetween in the X direction, it is possible to improve the assembling performance of the servo valve 10.

Furthermore, the magnet portion 36 is composed of the first permanent magnet 36a and the second permanent magnet 36b arranged in the X direction and magnetized in the X direction, and the second yoke 36c interposed between the first permanent magnet 36a and the second permanent magnet 36b. Thus, at the time of energization to the coil 34, the magnetic flux generated around the magnet portion 36 passes through the second yoke 36c, and as a result, a large thrust force arising from the magnetic attractive force is generated at the magnet portion 36 in the X direction. Therefore, it is possible to easily slide the movable element 16 in the X direction against the first elastic force or the second elastic force.

In this case, when the first permanent magnet 36a and the second permanent magnet 36b are magnetized in mutually different magnetization directions, it is possible to easily slide the movable element 16 toward the X1 direction or the X2 direction.

Further, since the servo valve 10 is further provided with the magnetic sensor 48 disposed adjacent to the magnet portion 36 in the X direction and configured to detect the magnetic flux from the magnet portion 36, it is possible to easily grasp the position of the movable element 16 relative to the neutral position from change in the magnetic flux detected by the magnetic sensor 48. Consequently, it is possible to perform a suitable servo control by adjusting an input signal supplied to the coil 34 depending on the position of the movable element 16.

Further, since the servo valve 10 having the movable portion 80 of the movable coil type or the movable portion 82 (the iron core 98) of the movable iron core type is also able to slide the movable element 16 in the X direction by the magnetic attractive force as in the case of the servo valve 10 having the aforementioned movable portion (the magnet portion 36) of the movable magnet type, it is possible to easily perform the positioning control of the movable element 16. In this case as well, it is possible to improve the responsiveness of the servo valve 10.

Furthermore, as in the modification shown in FIG. 16, also in the case that one end of the first elastic portion 62 is fixed to the spool 54 of the movable element 16, and the other end thereof is fixed to the end cover 22, while one end of the second elastic portion 64 is fixed to the second fixed portion 60 and the other end thereof is fixed to the connecting portion 58, similarly to the structure shown in FIG. 1, it is possible to improve, with a simple structure, the controllability in positioning the movable element 16 with respect to the neutral position.

Furthermore, if the first elastic portion 62 and the second elastic portion 64 are spring members, it is possible to achieve reduced costs in the servo valve 10.

Obviously, the present invention is not limited to the foregoing embodiment and modifications, and it is a matter of course that various constructions can be effected thereto based on the contents of the above description.

What is claimed is:

1. A servo valve comprising:
a body including a plurality of ports formed therein;
a movable element disposed inside the body in an axial direction of the body; and
a drive unit connected to the body in the axial direction and configured to slide the movable element in the axial direction to thereby switch connections of flow passages between the ports, the servo valve further comprising:
a first elastic portion extending in the axial direction inside the body on one end portion side thereof and having a first elastic force to press the movable element toward the drive unit in the axial direction, the drive unit being connected to another end portion of the body;
a second elastic portion extending in the axial direction inside the body on another end portion side thereof and having a second elastic force to press the movable element toward the one end portion side of the body along the axial direction; and
a connecting portion inside the body, wherein at a neutral position of the movable element at which driving of the drive unit is stopped, the connecting portion faces one end portion of the body and the movable element, wherein
one end of the first elastic portion is directly fixed to an end surface of an end portion of the movable element, wherein the end portion of the movable element terminates at the end surface and does not extend into or around the first elastic portion;
another end of the first elastic portion is fixed to an end cover that closes the one end portion of the body being apart from the drive unit;
one end of the second elastic portion is connected to the connection portion; and another end of the second elastic portion is fixed to the another end portion side of the body and the driving unit.

2. The servo valve according to claim 1, wherein:
the drive unit includes a tubular body comprising a magnetic body and connected to the body in the axial direction, and a movable portion provided inside the tubular body and forming a portion of the movable element, the movable portion including a movable magnet, a movable coil or a movable iron core; and
by moving the movable portion in the axial direction, the movable element including the movable portion is slid in the axial direction.

3. The servo valve according to claim 2, wherein:
the drive unit has a first yoke, which serves as the tubular body, connected to the body in the axial direction, a coil disposed inside the first yoke, and a magnet portion, which serves as the movable portion, provided inside the first yoke so as to face the coil; and
a magnetic attractive force exerted on the magnet portion due to energization to the coil causes the movable element to slide in the axial direction.

4. The servo valve according to claim 3, wherein:
protruding portions protruding inward of the first yoke are provided respectively at one end side and another end side of the first yoke in the axial direction; and
at the neutral position at which energization to the coil is stopped, the magnet portion is positioned between the two protruding portions.

5. The servo valve according to claim 4, wherein:
the coil is provided between the two protruding portions inside the first yoke; and
when the movable element is at the neutral position, the magnet portion and the coil are located at a substantially same position in the axial direction.

6. The servo valve according to claim 3. wherein:
the first yoke is connected to the body so as to cover the magnet portion within a moving range within which the magnet portion is moved in the axial direction by sliding of the movable element.

7. The servo valve according to claim 3, wherein:
the first yoke comprises two yokes arranged so as to interpose the coil between the two yokes in the axial direction.

8. The servo valve according to claim 3, wherein the magnet portion comprises:
two permanent magnets arranged in the axial direction and magnetized in the axial direction: and
a second yoke interposed between the two permanent magnets.

9. The servo valve according to claim 8, wherein:
the two permanent magnets are magnetized in mutually different directions.

10. The servo valve according to claim 3, wherein:
a sleeve provided with openings communicating with the respective ports is disposed inside the body:
the movable element includes the magnet portion, a spool disposed inside the sleeve and movable in the axial direction, and a shaft connecting the magnet portion and the spool in the axial direction;
an annular fixed portion is provided inside the tubular body and on a first yoke side, the annular fixed portion being fixed to the tubular body and the first yoke, wherein the shaft penetrates through the annular fixed portion, and the another end of the second elastic portion is fixed to the annular fixed portion;
the connecting portion is an annular member configured to, inside the body, abut against the spool and against the inner peripheral surface of the body, the shaft penetrating through the connecting portion.

11. The servo valve according to claim 3, further comprising:
a sensor disposed adjacent to the magnet portion in the axial direction and configured to detect magnetic flux.

12. The servo valve according to claim 2, wherein:
the drive unit includes a yoke, which serves as the tubular body, connected to the body in the axial direction, two permanent magnets provided respectively at opposite ends of the yoke in the axial direction, an iron core provided inside the yoke so as to face the yoke, and a coil wound around the iron core;
the movable portion comprises the iron core and the coil; and
the movable element is slid in the axial direction by a magnetic attractive force including at least one of a force acting between the two permanent magnets and the iron core, and a force exerted on the movable portion due to enemization to the coil.

13. The servo valve according to claim 2, wherein:
the drive unit includes a yoke, which serves as the tubular body, connected to the body in the axial direction, a permanent magnet provided at a central portion of the yoke in the axial direction, a coil provided inside the yoke in the axial direction so as to face the permanent magnet, and an iron core, which serves as the movable portion, provided inside the yoke in the axial direction; and
the movable element is slid in the axial direction by a magnetic attractive force including at least one of a force acting between opposite ends of the yoke and the iron core, and a force exerted on the iron core due to energization to the coil.

14. The servo valve according to claim 1, wherein:
the first elastic portion and the second elastic portion are spring members.

15. The servo valve according to claim 1, wherein:
a restoring force to return the movable element to the neutral position is adjusted by balancing a force exerted on the movable element from the drive unit with the first elastic force or the second elastic force.

* * * * *